(12) United States Patent
Rye et al.

(10) Patent No.: US 9,003,689 B1
(45) Date of Patent: Apr. 14, 2015

(54) COVER FOR THE HEAD OF A JIG-TYPE LURE

(71) Applicants: Ryan Patrick Rye, Lawrenceville, GA (US); Shelby Earl Rye, Dickson, TN (US)

(72) Inventors: Ryan Patrick Rye, Lawrenceville, GA (US); Shelby Earl Rye, Dickson, TN (US)

( * ) Notice: Subject to any disclaimer, the term of this patent is extended or adjusted under 35 U.S.C. 154(b) by 0 days.

(21) Appl. No.: 14/076,209

(22) Filed: Nov. 9, 2013

(51) Int. Cl.
*A01K 85/00* (2006.01)

(52) U.S. Cl.
CPC ...................................... *A01K 85/00* (2013.01)

(58) Field of Classification Search
USPC .............. 43/42.09, 42.1, 42.24, 42.25, 42.28, 43/42.39, 42.35, 42.32, 42.81
See application file for complete search history.

(56) References Cited

U.S. PATENT DOCUMENTS

| | | | | |
|---|---|---|---|---|
| 3,418,745 A * | 12/1968 | Loos | ............................ | 43/42.09 |
| 6,061,948 A * | 5/2000 | Boucek | ........................ | 43/42.09 |
| 2009/0119971 A1* | 5/2009 | Miyasato et al. | ............. | 43/42.39 |
| 2011/0214332 A1* | 9/2011 | Partridge | ..................... | 43/42.06 |
| 2012/0079757 A1* | 4/2012 | Rye et al. | ..................... | 43/42.09 |

* cited by examiner

*Primary Examiner* — Christopher Harmon

(57) ABSTRACT

An improved cover for a pre-existing jig-type fishing lure comprises an elastomeric membrane which conceals a greater amount of the hard, weighted head of a pre-existing jig-type lure, as compared to prior art. One or more flap elements, a thin portion of the membrane located generally opposite a mount-enabling first aperture, a second aperture located generally opposite the mount-enabling first aperture, or a combination thereof, enables the improved cover to conceal more of the weighted head. The cover can be attached to or removed from the weighted head without having to break the line of an already-tied jig-type lure. The cover also enables fluttering fish attracting elements and the generation of acoustic stimuli while the lure itself remains stationary. The elastomeric membrane can further comprise a generally concave or flat surface to enable a pre-existing jig-type lure to exhibit an oscillating-type motion when retrieved.

36 Claims, 22 Drawing Sheets

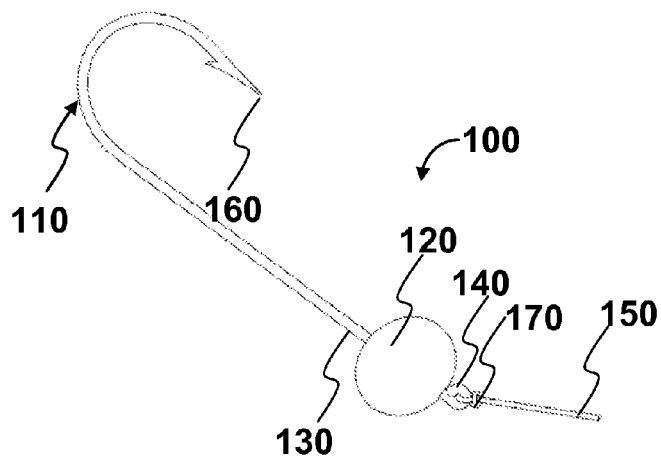
FIG. 1A
(PRIOR ART)
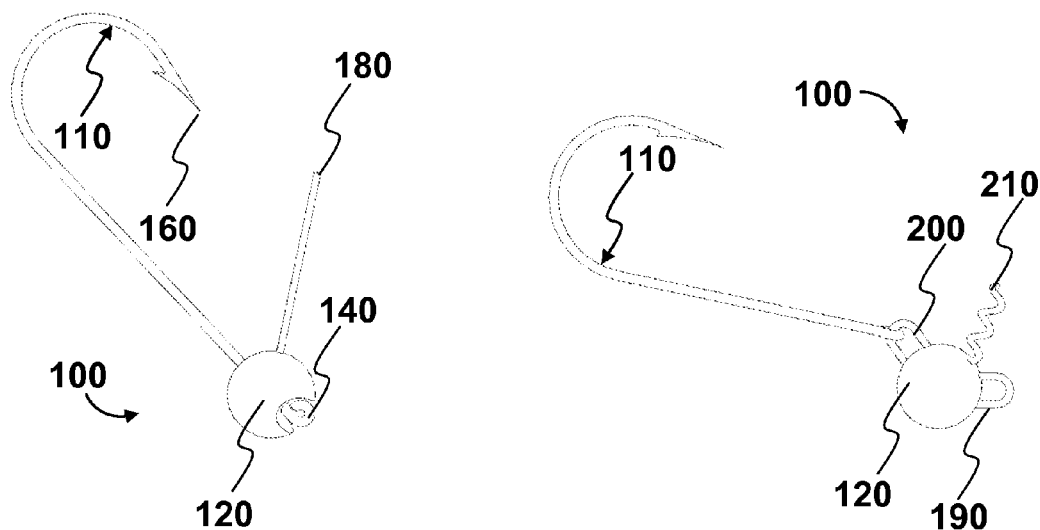
FIG. 1B
(PRIOR ART)
FIG. 1C
(PRIOR ART)

COVER FOR THE HEAD OF A JIG-TYPE LURE

BACKGROUND INFORMATION

This disclosure generally relates to artificial fishing lures. More specifically, this disclosure relates to an improved cover for the weighted head of a pre-existing jig-type fishing lure, wherein the improved cover more completely conceals the weighted head while simultaneously enabling the jig-type lure to exhibit new types of fish-attracting behavior.

Jig-type fishing lures comprise a weighted head, often made of lead or a similarly dense metal, rigidly coupled to a hook. A fishing line is tied to the hook eyelet, which fully or partially protrudes from the weighted head. A less common jig-type lure pivotally—rather than rigidly—couples the hook to the weighted head through a small looped wire form member protruding from generally opposite ends of the weighted head. Many pre-existing jig-type lures also commonly include protrusions from the generally top portion of the weighted head in the form of hook guards, weed guards, or coil spring-type soft body mounts. Lastly, a pre-existing soft body member, or other form of bait, is typically mounted onto the hook shank or coil spring-type mount to help conceal the hook and further attract fish.

Jig-type lures are mostly fished slowly along the bottom underwater surface in an effort to tempt nearby fish, as compared to common "reaction-type" lures which require a faster retrieval in order to enable their attractive behavior, such as crankbaits, spinnerbaits, and buzzbaits. As a result, the jig-type lure is typically evaluated much longer by a hovering fish before the fish chooses either to pick up the lure or swim away. Thus, it is crucial that the overall visual appearance and tactile feedback of a jig-type lure to be as lifelike as possible in order that a committed fish not quickly lose interest and/or immediately spit out the lure.

Prior art relies on an elongated aperture of the elastomeric membrane for stretching the membrane around a weighted head of a pre-existing jig-type lure. However, the primary disadvantage of such a cover is that as the prior-art cover stretches to envelop most of the weighted head, the length and width of the elongated aperture increase due to the elastic stretching of the membrane. Because of this stretching effect, prior-art improved covers still undesirably leave a significant amount of the underlying weighted head surface exposed. If this exposed weighted head surface of the pre-existing jig lure were an unappealing color that did not naturally match the color of the attached cover, or if a fish were to bite down on this remaining exposed hard surface, then the fish would immediately recognize the lure as artificial and reject the lure. Compared to prior art, the improved cover described herein conceals a greater amount of the weighted head, which enables a pre-existing jig-type lure to both look and feel more lifelike.

Objects and advantages of the improved cover are as follows:
1. It is an object of the improved cover to conceal a greater amount of the surface of the weighted head of a pre-existing jig-type lure, as compared to prior art.
2. It is an object of the improved cover to provide a means for a pre-existing jig-type lure to exhibit new types of fish-attracting behavior through a desirable bend in the attached fishing line at a predetermined pivot point along the surface of the cover, while simultaneously protecting the fishing line knot.
3. It is an object of the improved cover to provide a means for a pre-existing jig-type lure to be able to emit fish-attracting sounds while the pre-existing jig-type lure itself remains stationary.
4. It is an object of the improved cover to provide a means for a pre-existing jig-type lure to exhibit an inchworm-type expansion and contraction motion during retrieval.
5. It is an object of the improved cover to enable the hook of a pre-existing jig-type lure to exhibit a generally swaying or undulating-type behavior when the attached fishing line is twitched.
6. It is an object of the improved cover to provide a means for a pre-existing jig-type lure to exhibit a wobbling motion when the attached fishing line is retrieved at a steady speed.

In addition, each preferred embodiment of the improved cover disclosed herein can be attached to or removed from the weighted head of a pre-existing jig-type lure without untying or breaking the knot of the attached fishing line. This feature allows and angler to quickly and easily change the cover of a weighted head in response to varying fishing conditions. These and other objects and advantages will become readily apparent upon review of the following specification and drawings.

BRIEF DESCRIPTION OF THE DRAWINGS

FIG. 1A is a diagrammatic perspective view of a first type of a pre-existing jig-type fishing lure.

FIG. 1B is a diagrammatic perspective view of a second type of a pre-existing jig-type lure.

FIG. 1C is a diagrammatic perspective view of a third type of a pre-existing jig-type lure.

Figure 2A:
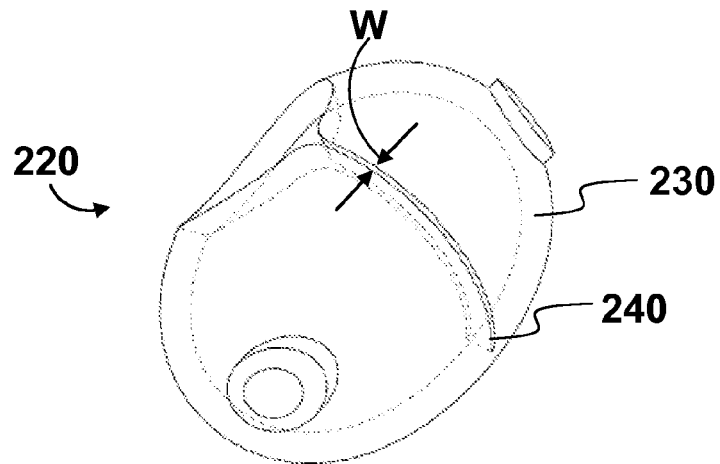
FIG. 2A is a diagrammatic perspective view of a prior-art cover for the weighted head of a jig-type lure, comprising an elongated aperture.

| Drawings - Reference Numerals | | | |
|---|---|---|---|
| 100 | pre-existing jig-type lure | 110 | hook |
| 120 | weighted head | 130 | hook shank |
| 140 | hook eyelet | 150 | fishing line |
| 160 | hook point | 170 | knot |
| 180 | hook guard | 190 | first wire form eyelet |
| 200 | second wire form eyelet | 210 | coil spring-type mount |

-continued

Drawings - Reference Numerals

| | | | |
|---|---|---|---|
| 220 | cover | 230 | elastomeric membrane |
| 240 | first aperture | 250 | substantially exposed portion |
| 260 | second aperture | 270 | small cavity |
| 280 | fish-attracting element | 290 | pair of holes |
| 300 | flap element | 310 | folding direction |
| 320 | pivot point | 330 | forward direction |
| 340 | rocking direction | 350 | undulating direction |
| 360 | first attachment direction | 370 | second attachment direction |
| 380 | slotted portion | 390 | rattle chamber |
| 400 | rattle member | 410 | solid weight |
| 420 | concave surface | 430 | thin portion |
| 440 | horizontal plane | | |

DETAILED DESCRIPTION OF PREFERRED EMBODIMENTS

FIGS. 1A-1C illustrate three common embodiments of a pre-existing jig-type lure 100. In FIG. 1A, a hook 110 is embedded within a metallic weighted head 120, and the hook 110 comprises a generally straight hook shank 130 with a hook eyelet 140 located at one end for attaching a fishing line 150 thereto, and a hook point 160 located at a generally opposite end. FIG. 1B is a slight variation of FIG. 1A, wherein a portion of the weighted head 120 is shaped to help conceal the hook eyelet 140, such that the hook eyelet 140 is partially recessed into the weighted head 120. This recessed hook eyelet 140 of FIG. 1B helps make the line knot 170 less noticeable to a fish. A hook guard 180 is shown also protruding from the weighted head 120, and this hook guard 180 generally acts to prevent the hook point 160 from becoming snagged by underwater objects, such as weeds, rocks, and brush. A third pre-existing jig-type lure 100 is shown in FIG. 1C, wherein a wire form member is embedded in the weighted head 200 and comprises two eyelets—a first wire form eyelet 190 for the coupling of a fishing line 150 thereto, and a second wire form eyelet 200 for the coupling of a hook 110 thereto. The hook 110 of FIG. 1C is pivotally coupled to the weighted head 120 of FIG. 1C, whereas the hook 110 of FIGS. 1A-1B is rigidly coupled to the weighted head 120. A coil spring-type mount 210 is also shown in FIG. 1C, and protrudes from the weighted head 120 enabling the attachment of an artificial soft body member, such as a soft rubber worm, lizard, or other soft artificial creature. It should be understood that the hook guard 180 of FIG. 1B and the coil-spring-type mount 210 of FIG. 1C can be integrated with any pre-existing jig-type lure 100.

FIG. 2A shows prior art of a cover 220 for the weighted head 120 of a pre-existing jig-type lure 100. The cover 220 consists of an elastomeric membrane 230 having a first aperture 240 of minimum width W, with the first aperture 240 having a predetermined open area. In the context of this invention, the term "open area" is defined as the area of an invisible surface created by the opening of any aperture of the elastomeric membrane 230, such that if the open area of an aperture were reduced to zero, then said aperture would then be wholly closed. Open area is expressed in units of length squared, such as square millimeters, for example.

Figure 2B:
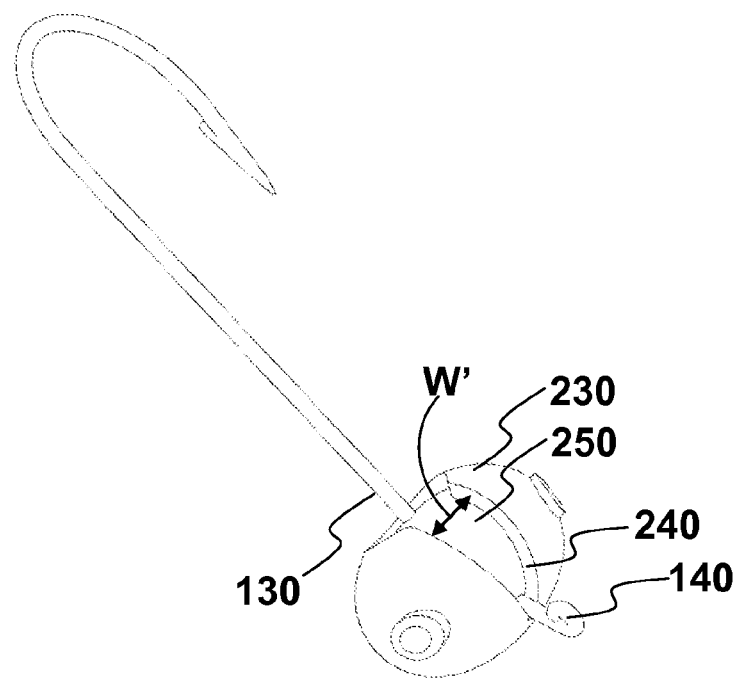
FIG. 2B is a diagrammatic perspective view of the prior-art cover of FIG. 2A, as mounted onto the first type pre-existing jig fishing lure.

The elastomeric properties of the membrane enable the membrane to expand as the cover 220 is stretched and mounted on a pre-existing weighted head 120. The primary disadvantage of the cover 220 in FIG. 2A is that when stretched and mounted on a larger weighted head 120, the un-mounted width W of the first aperture 240 increases to a mounted width W', as shown in FIG. 2B, due to the dimensional stretching of the elastomeric membrane 230, and leaves an undesirable substantially exposed portion 250 of the weighted head 120. In other words, the opening area of the first aperture 240 must increase as the cover 220 expands to fit snugly around a larger weighted head 120. As a result, when stretched onto a pre-existing weighted head 120, the appearance of the post-mounted cover 220 is substantially different than the appearance of the pre-mounted cover 220. Stretching the prior-art cover 220 of FIG. 2A onto a pre-existing weighted head 120 results in the appearance and mounting condition shown in FIG. 2B, wherein the mounted width W' of the first aperture 240 and the corresponding open area of the first aperture 240 is now much larger, much more visually unappealing, and much less lifelike than the un-mounted condition of a prior-art cover 120 depicted in FIG. 2A. A fish which might otherwise be attracted to the cover 220 of FIG. 2A in reality sees a cover 120 like that shown in FIG. 2B. If the elastomeric membrane 230 is a different color than the weighted head 120, then the fish will easily notice this un-lifelike visual contrast created by the substantially-exposed portion 250 of the openly-stretched first aperture 240. Even if the fish picked up the lure, but bit or sensed the substantially exposed portion 250 of the hard weighted head 120 not able to be concealed by the prior-art elastomeric membrane 230, then the fish would immediately reject the lure.

Figure 3A:
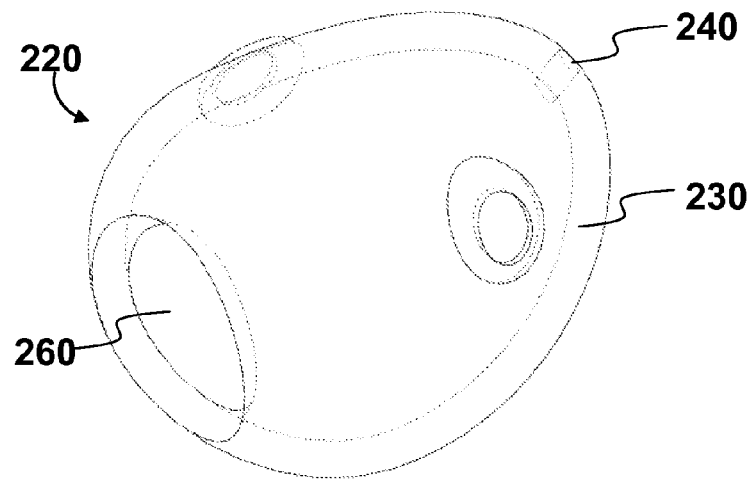
FIG. 3A is a diagrammatic perspective view of a prior-art cover for the weighted head of a jig-type lure, comprising two apertures.
Figure 3B:
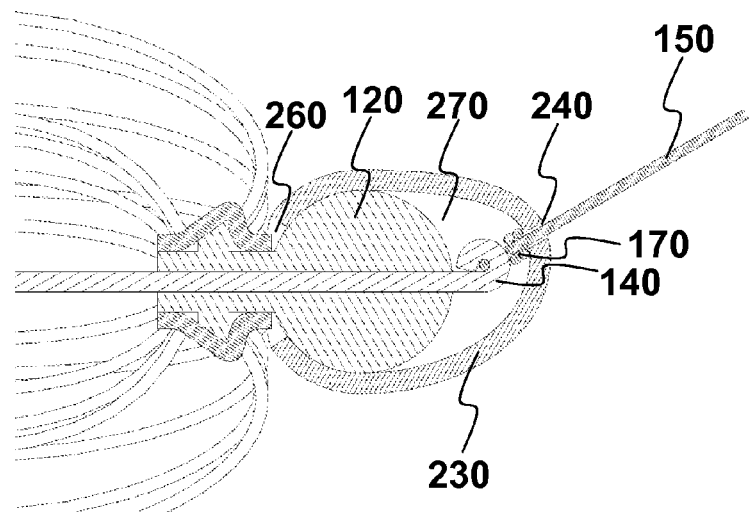
FIG. 3B is a diagrammatic median plane section view of the prior-art cover of FIG. 3A, as mounted onto a first-type pre-existing jig-type lure.

FIG. 3A shows a prior-art, dual-aperture cover 220 for a pre-existing jig-type lure 100, while FIG. 3B illustrates a median plane section view of the cover 220 of FIG. 3A, as mounted to a pre-existing jig-type lure 100. In addition to the inclusion of a second aperture 260, a small cavity 270 exists in the front of the cover 220 for surrounding the line knot 170. The fishing line 150 exits through the first aperture 240 and is not altered in shape or bent any way by the elastomeric membrane 230. This is a limitation of the prior-art cover 230 of FIG. 3A, as it will become obvious that there are substantial advantages for a cover 220 which creates a bend in the fishing line 150 at a location generally above or behind the hook eyelet 140.

Figure 4:
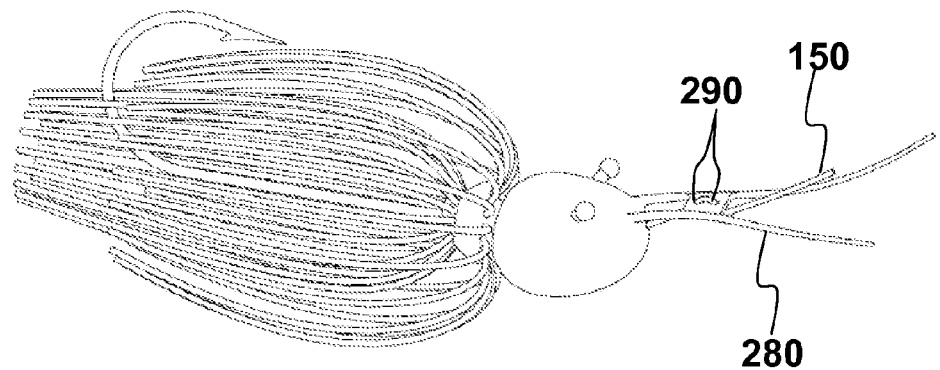
FIG. 4 is a diagrammatic perspective view of a prior-art cover for the weighted head of a jig-type lure, wherein a pair of fish-attracting elements contains a pair of apertures for threading a fishing line therethrough.

FIG. 4 depicts a prior-art cover 220 wherein a fish-attracting element 280 extends in front of the weighted head 120 and contains a pair of holes 290 for the threading of a fishing line 150 therethrough. When an angler twitches the fishing line 150, the fish-attracting elements 280 can flutter or undulate in order to further tempt a hovering fish. The obvious disadvantage with this type construction is that due to the pair of holes 290, the cover 220 cannot be attached to or removed from the already-tied, pre-existing jig-type lure 100 without cutting the fishing line 150. It would be more advantageous if a cover 220 comprised a means to enable a fluttering motion of one or more fish-attracting elements 280 yet was simultaneously easily removable from an already-tied, pre-existing jig-type lure 100.

Figure 5A:
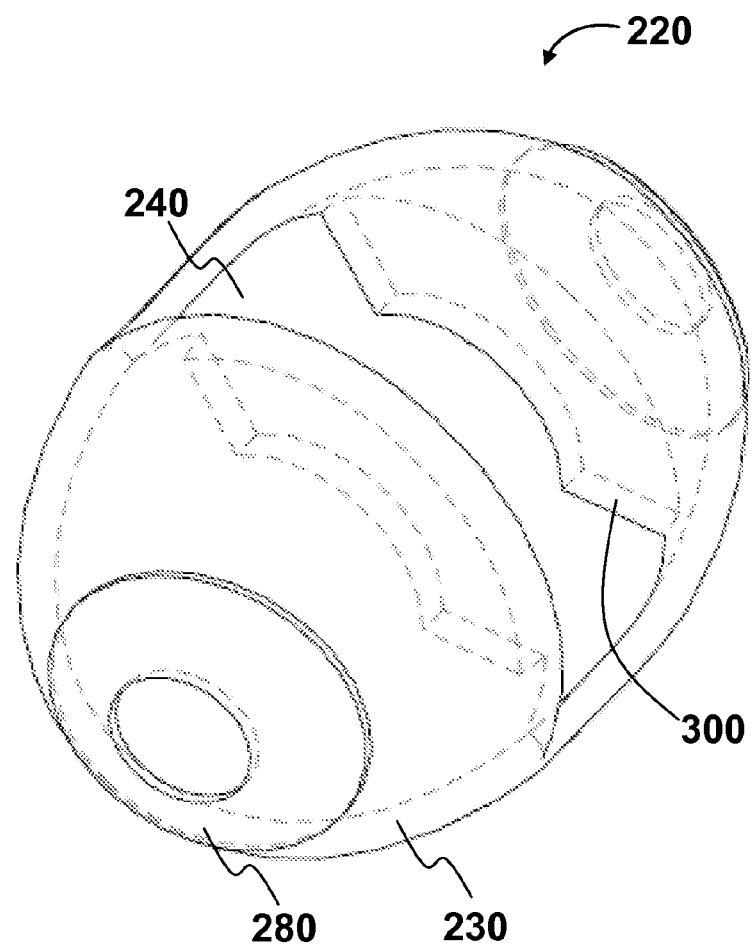
FIG. 5A is a diagrammatic perspective view of a first preferred embodiment of an improved cover for the weighted head of a jig-type lure, wherein two novel flap elements enable a substantial reduction in the aperture opening size upon the cover being mounted to a weighted head.

Turning now to a first preferred embodiment of an improved cover 220 for the weighted head 120 of a pre-existing jig-type lure 100, FIG. 5A illustrates an elastomeric membrane 230 having a constant or variable wall thickness defining a generally hollow cavity, with the membrane also having at least one novel flap element 300 extending from the first aperture 240. The one or more flap elements 300 achieve what the prior art of FIG. 2A cannot. Specifically, the flap elements 230 help to conceal the substantially exposed portion 250 of the weighted head 120 left uncovered by the prior-art cover 220 in FIG. 2B.

Figure 5B:
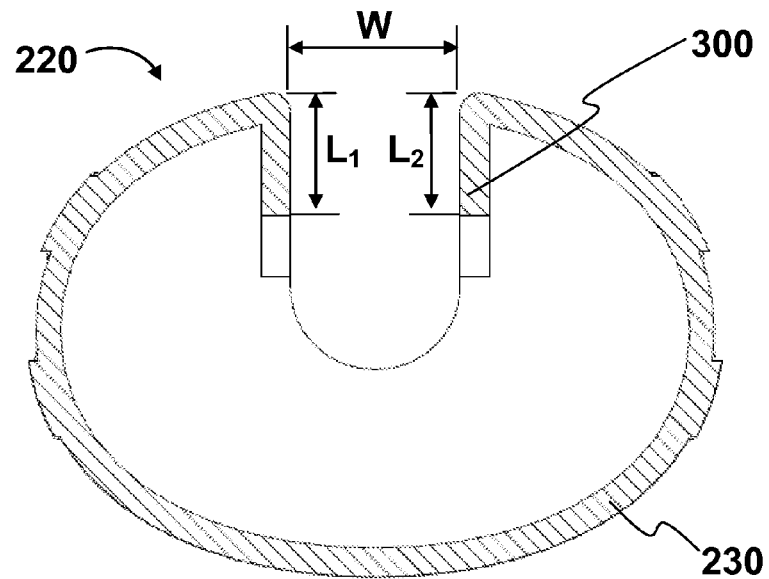
FIG. 5B is a diagrammatic transverse plane section view through the cover of FIG. 5A. All flap elements are shown in the folded or "as-molded" position.
Figure 5C:
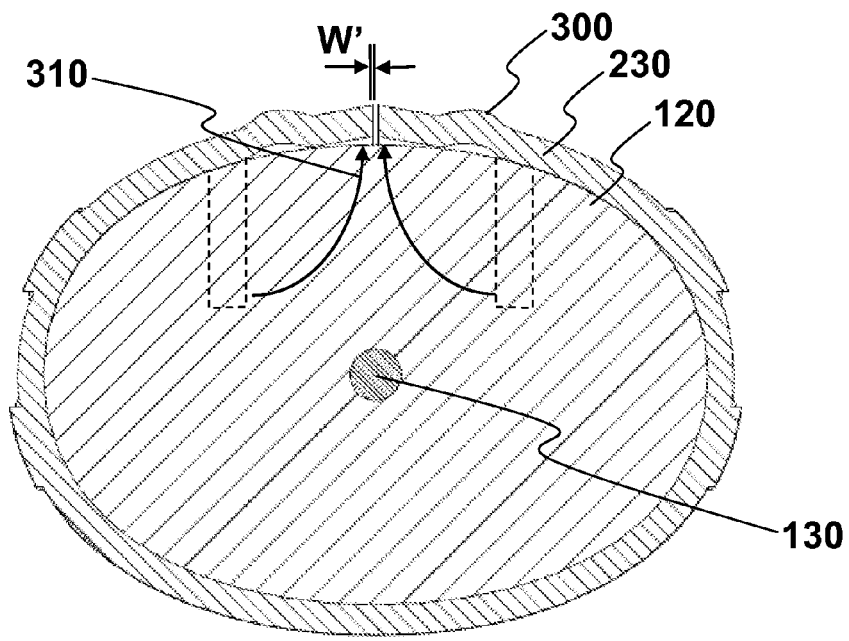
FIG. 5C is a diagrammatic transverse plane section view of the cover of FIG. 5A, as mounted on the weighted head of a pre-existing jig-type fishing lure. Both flap elements are now pushed up and supported by the weighted head to generally conform to the contour of the weighted head surface.
Figure 5D:
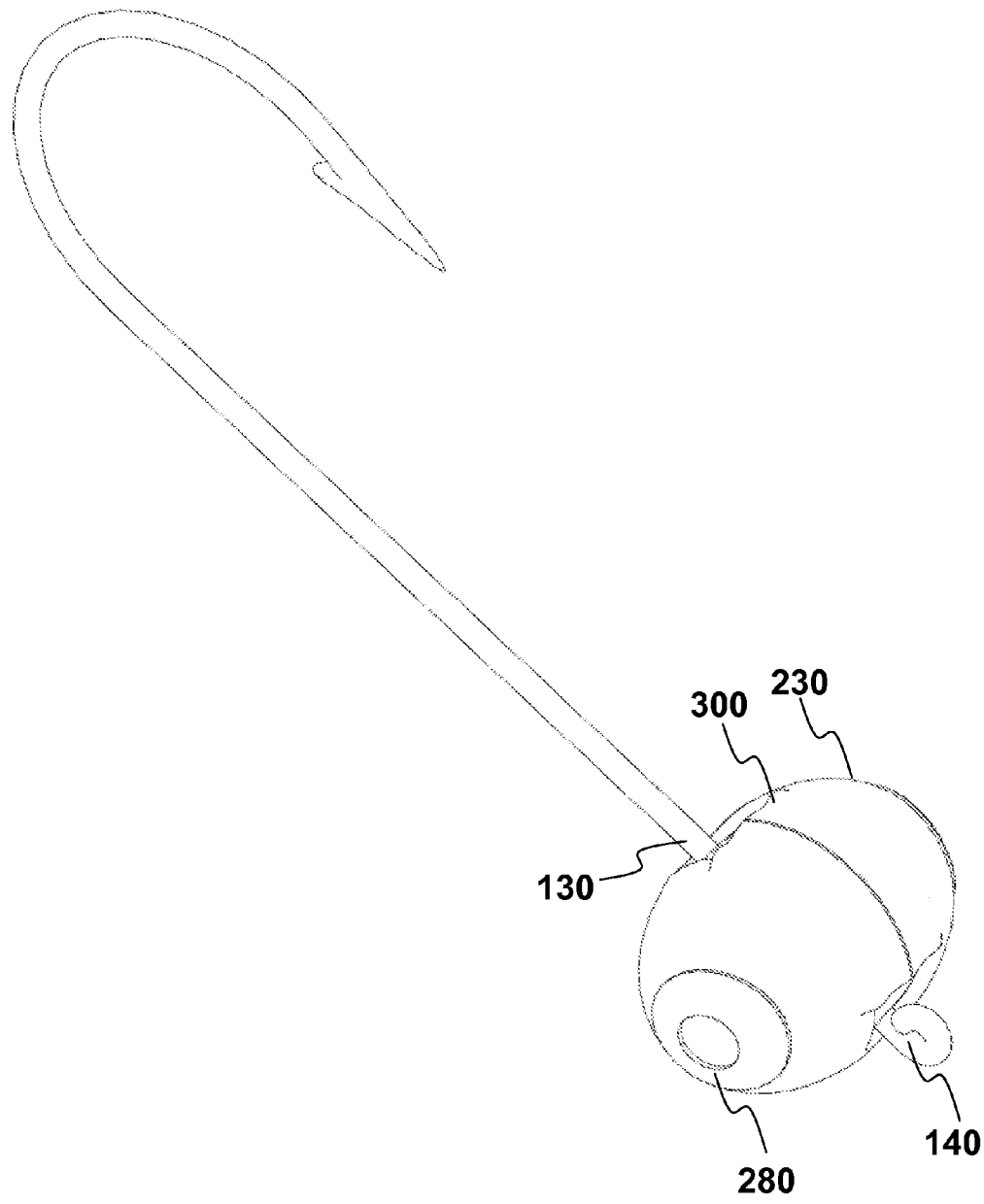
FIG. 5D is a diagrammatic perspective view of the cover of FIG. 5A, as mounted onto a pre-existing jig-type lure. The flap elements are supported as in FIG. 5C, and visibly substantially close the first aperture, unlike the prior-art cover in FIG. 2B.

FIG. 5B shows a transverse plane section view through the cover 220, detailing the orientation of the flap elements 300 as they would be formed or molded as part of the elastomeric membrane 230. For maximum concealment of the weighted head 120, the combined length $L_1$ plus $L_2$ of each flap element 300, should be generally equal to or greater than the un-mounted width W of the first aperture 240. A section view of the mounted orientation of the cover 220 is shown in FIG. 5C. As the cover 220 expands to mount onto a weighted head 120 of a pre-existing jig-type lure 100, the flap elements 300 are forced to swing along a folding direction 310 by the presence of the weighted head 100 and, due to their elastomeric properties, rest snugly against the outer surface of the weighted head 120. Comparing FIG. 5C to FIG. 5B, it is clearly seen how the flap elements 300 fold due to the support from the weighted head 300 and help reduce the un-mounted width W of the first aperture 240 to a much smaller mounted width W' of the first aperture 240. The benefits of such an improved cover 220 can be seen in FIG. 5D, which illustrates the appearance of the improved cover 220 due to the presence of the flap elements 300. In comparing FIG. 5D to the prior-art illustration of FIG. 2B, the novel flap elements 300 result in significantly less exposed area of the weighted head 120 after the improved cover 220 is mounted to the weighted head 120 of a pre-existing jig-type lure 100. In FIG. 5D, the first aperture 240 surrounds or circumscribes the entrance of the hook eyelet 140 into a weighted head 120 and also extends to circumscribe the exit of the hook shank 130 from the weighted head 120. It should be obvious here that the cover 220 can be of a dual-aperture type, wherein a first aperture 240 circumscribes only the entrance of the hook eyelet 140 into a weighted head 120, while a second aperture 260 circumscribes only the exit of the hook shank 130 from the weighted head 120. In either case, at least one aperture circumscribes the hook eyelet 140. It should also be noted that in a multi-aperture embodiment of the cover 220, one or more flap members 300 can extend from any or all apertures.

Figure 6A:
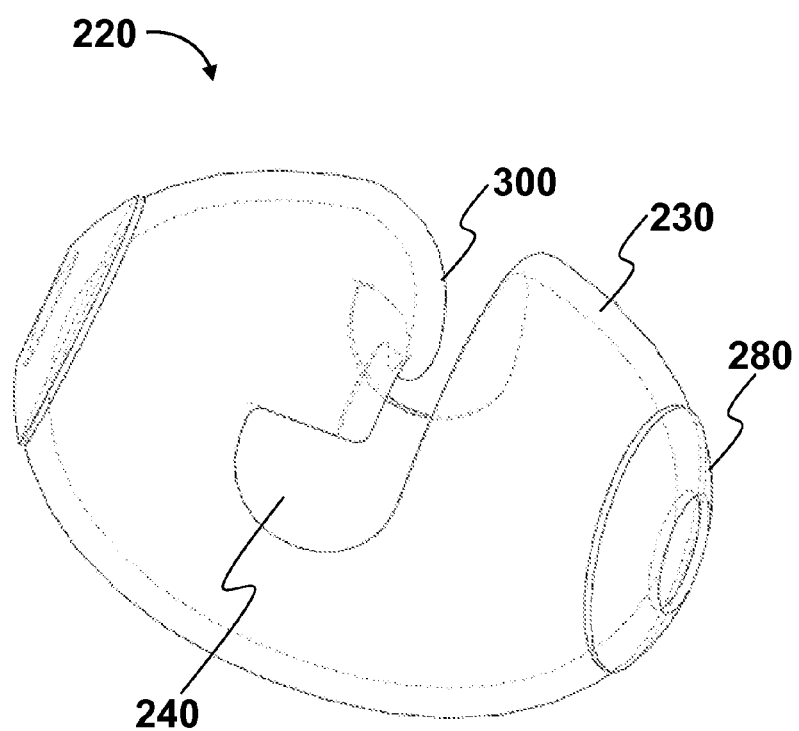
FIG. 6A is a diagrammatic perspective view of a second preferred embodiment of an improved cover for the weighted head of a jig-type lure, wherein a single flap element can be used to close the visibly open aperture of FIG. 2B.
Figure 6B:
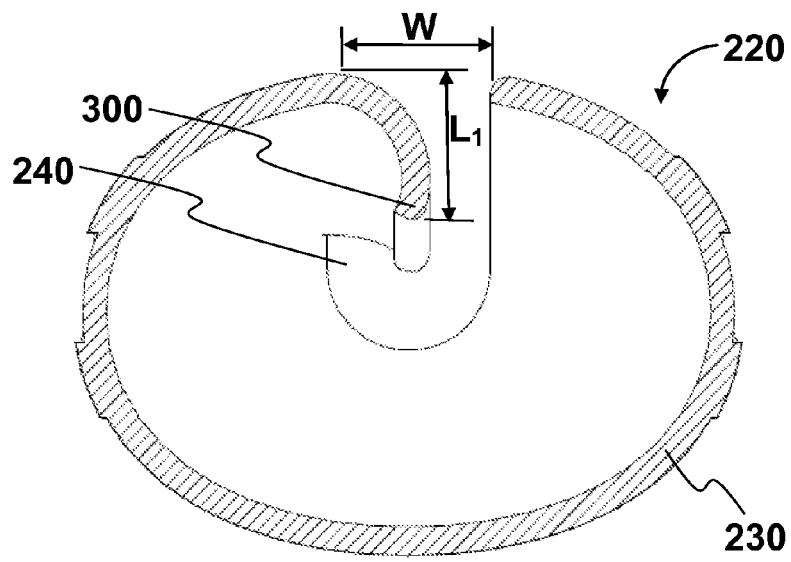
FIG. 6B is a diagrammatic transverse plane section view through the cover of FIG. 6A. The single flap element is shown folded in the "at rest" position as the cover would be tooled or molded.
Figure 6C:
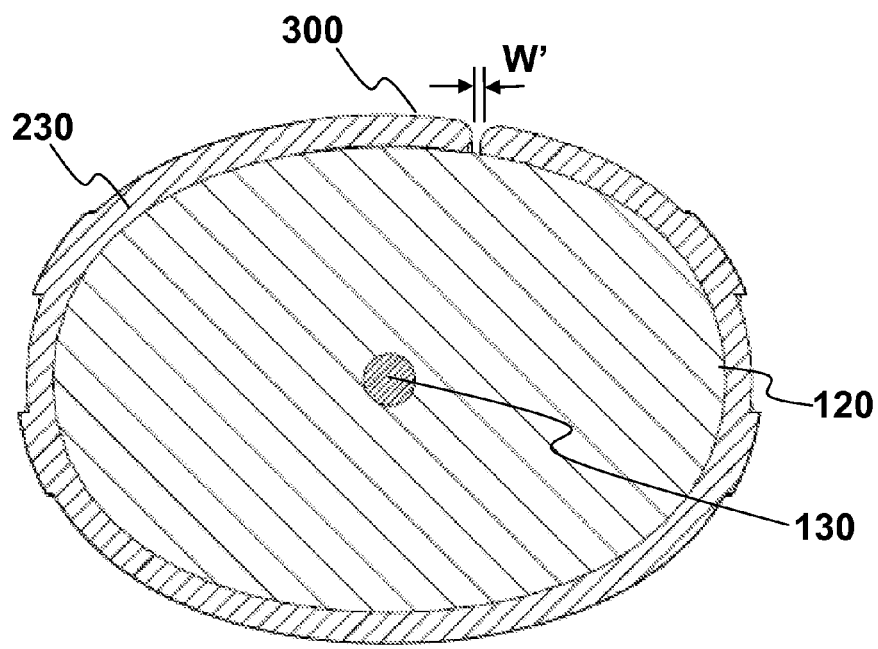
FIG. 6C is a diagrammatic transverse plane section view through the cover of FIG. 6A, as mounted on the weighted head of a pre-existing jig-type lure. The single flap element is supported by the weighted head and substantially closes the first aperture, unlike the prior-art cover in FIG. 2B.
Figure 6D:
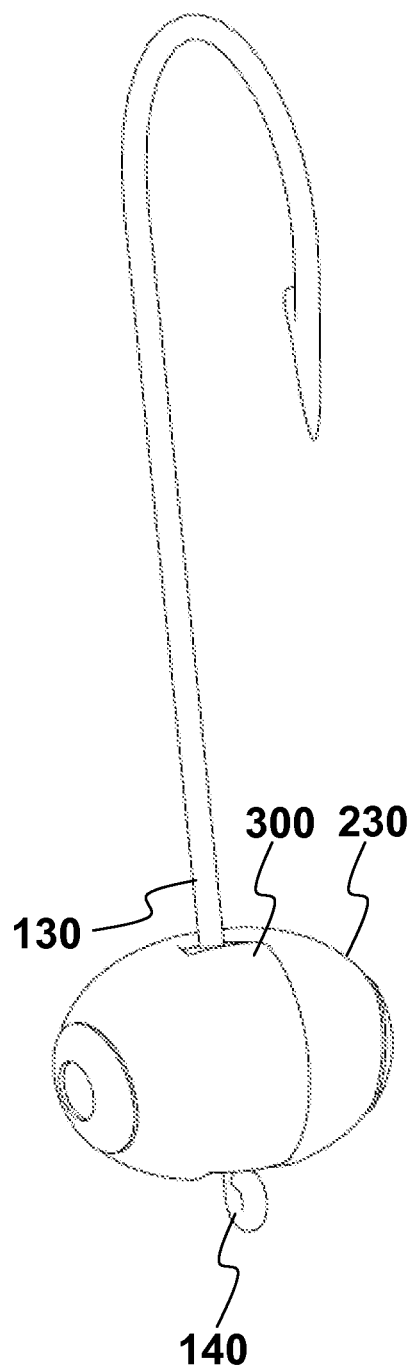
FIG. 6D is a diagrammatic perspective view of the cover of FIG. 6A when mounted on a pre-existing jig-type lure. The flap element is supported in the extended position, as in FIG. 6C, to visibly close the slotted opening, unlike the prior art improved cover in FIG. 2B.

Although multiple flap elements 300 are shown in the preferred embodiment of FIG. 5A, it is also possible to conceal a greater portion of the weighted head 120 with just a single flap element 300. FIG. 6A and FIG. 6B show a perspective view and transverse plane section view, respectively, of a second preferred embodiment of an improved cover 220 utilizing only one flap element 300. Similar to the condition described in the first preferred embodiment, for most optimum coverage of the first aperture 240 once the elastomeric membrane 230 is stretched onto a weighted head 120, the length $L_1$ of the flap element 300 should be equal to or greater than the width W of the first aperture 240 of the cover 220 in the un-mounted condition. The flap element 300 is formed or tooled in the generally inward-facing orientation shown in FIG. 6B, and once the cover 220 is mounted onto a weighted head, the flap element 300 is supported by the presence of the weighted head 120, as shown in FIG. 6C. Similar to FIG. 5C, the un-mounted width W of the first aperture 240 in FIG. 6C is significantly reduced to a less-noticeable mounted width W'. FIG. 6D illustrates how a cover 220 having a single flap element 300 can appear on a pre-existing jig-type lure 100. The presence of at least one flap element 300, once the improved cover 220 is mounted on a pre-existing jig-type lure 100 as shown in FIG. 6D, clearly enables the elastomeric membrane 230 to conceal more surface area of the weighted head 120 as compared to the prior-art cover 220 of FIG. 2B.

Figure 7A:
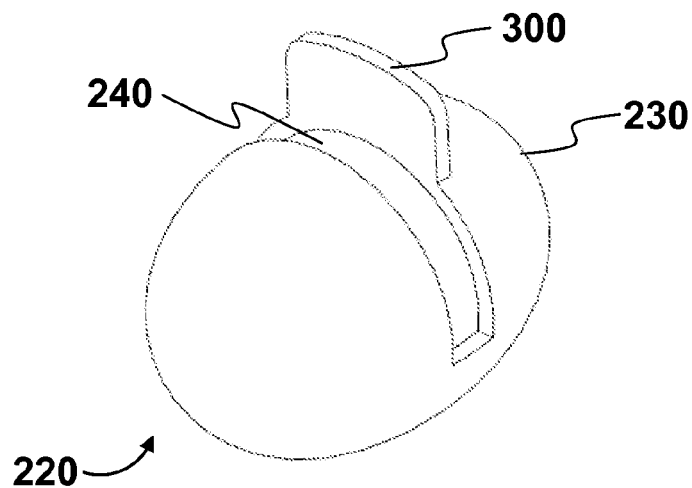
FIG. 7A is a diagrammatic perspective view of a third preferred embodiment of an improved cover for the weighted head of a pre-existing jig-type lure, comprising one exterior flap element.
Figure 7B:
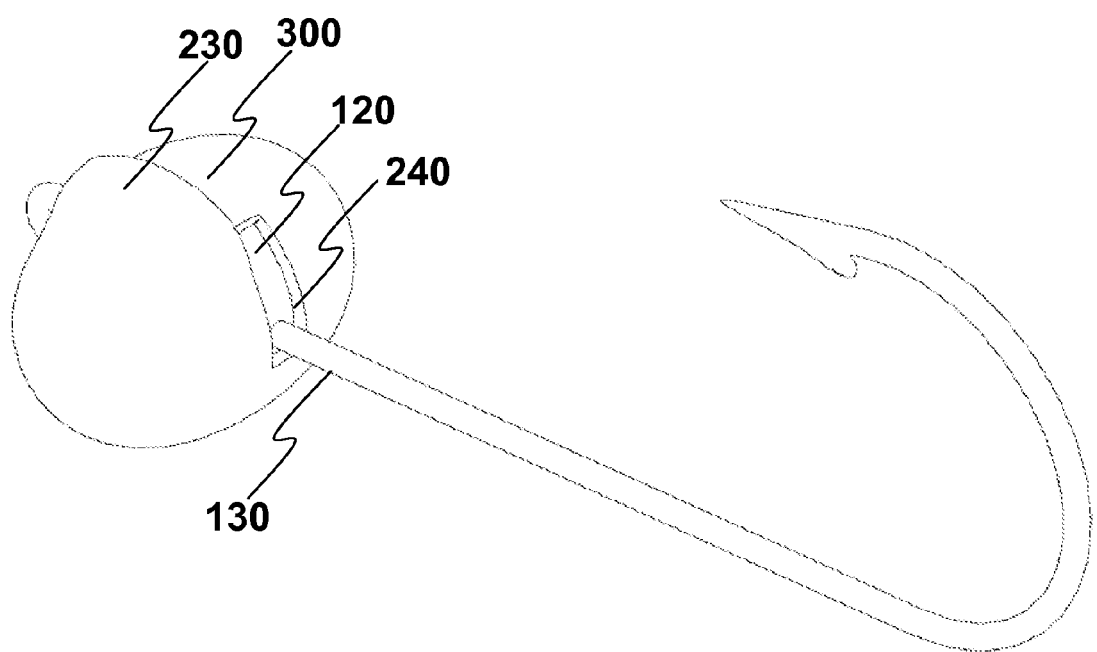
FIG. 7B is a diagrammatic perspective view of the cover of FIG. 7A, as mounted onto a pre-existing jig-type lure. The flap element is folded and tucked underneath a portion of the edge of the first aperture located generally opposite the flap element.

While the flap elements of FIGS. 5A and 6A are formed in a generally inward direction, a flap element 300 may be formed in a generally outward direction as well. An outward-facing flap element 300 is shown as part of a third preferred embodiment of an improved cover 220 in FIG. 7A. The outward-facing flap element 300 can also help conceal most of the first aperture 240 by being folded and tucked underneath a portion of the elastomeric membrane 230 located both along the continuous edge of the first aperture 240 and generally opposite the flap member 300, as shown in FIG. 7B. An outward-facing flap element 300 can be much longer than any inward-facing flap element 300, as the length of the outward-facing flap element of FIG. 7A is not limited by the interior hollow cavity dimensions of the elastomeric membrane 230. This is unlike the flap elements 300 shown in FIG. 5B and FIG. 6B, which are limited in length by the dimensions of the generally hollow cavity of the elastomeric membrane 230.

Figure 8A:
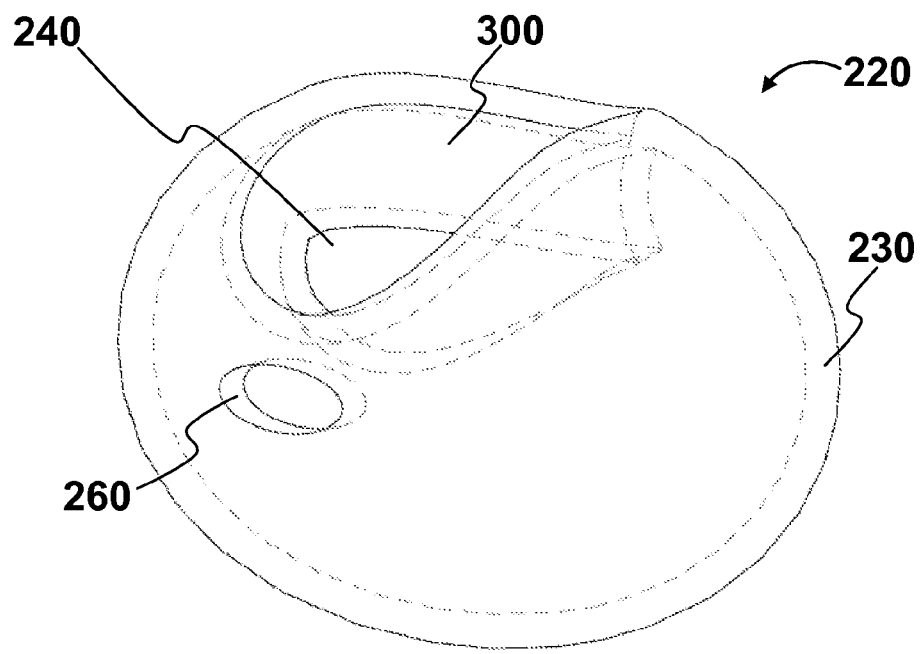
FIG. 8A is a diagrammatic perspective view of a fourth preferred embodiment of a improved cover for the weighted head of a pre-existing jig-type lure, comprising one continuous inward-facing or bowl-shaped flap element and two apertures.
Figure 8B:
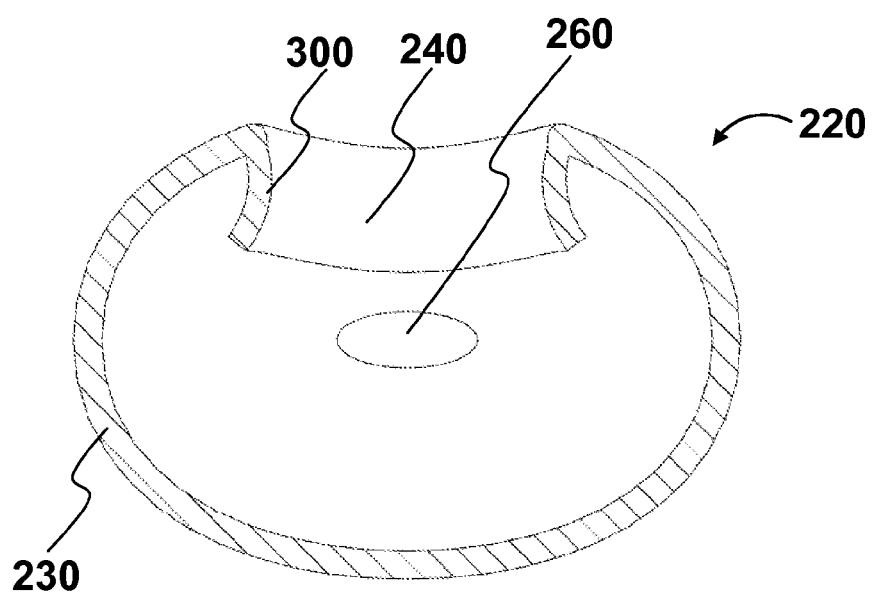
FIG. 8B is a diagrammatic transverse plane section view through the cover of FIG. 8A, more clearly detailing the shape of the continuous flap element.

A flap element 300 may also be continuous in shape by traversing the entire continuous edge of the first aperture 240, as shown by a fourth preferred embodiment of an improved cover 220 in FIG. 8A and FIG. 8B. The flap element 300 is formed or molded in a shape similar to the sides of a bowl or a generally closed-loop, inward-facing surface. A second aperture 260 is also shown for slidably coupling the cover 220 along a hook 110, which prevents the cover 220 from being lost if a fighting fish pulls the cover 220 off of the weighted head 120.

Figure 8C:
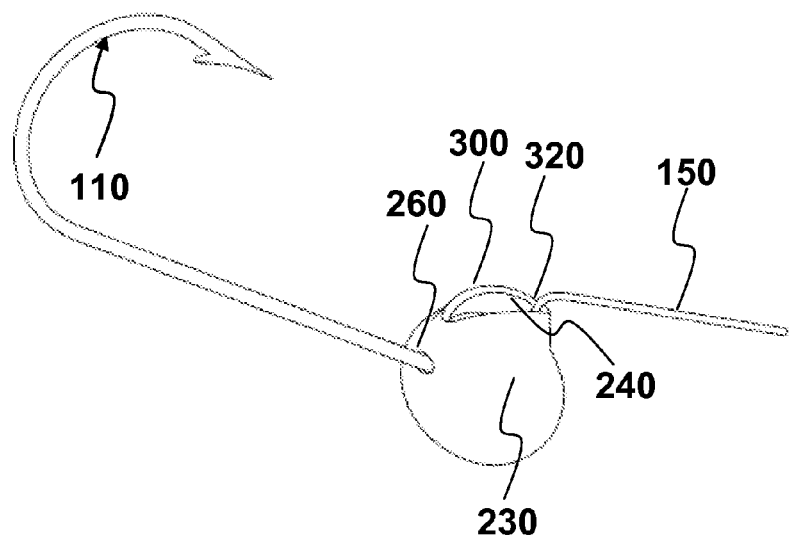
FIG. 8C is a diagrammatic perspective view of the cover of FIG. 8A, as mounted on the weighted head of a pre-existing jig-type lure. The continuous inward-facing flap element is pushed outward into a generally convex or outward-facing shape by the presence of the weighted head.
Figure 8D:
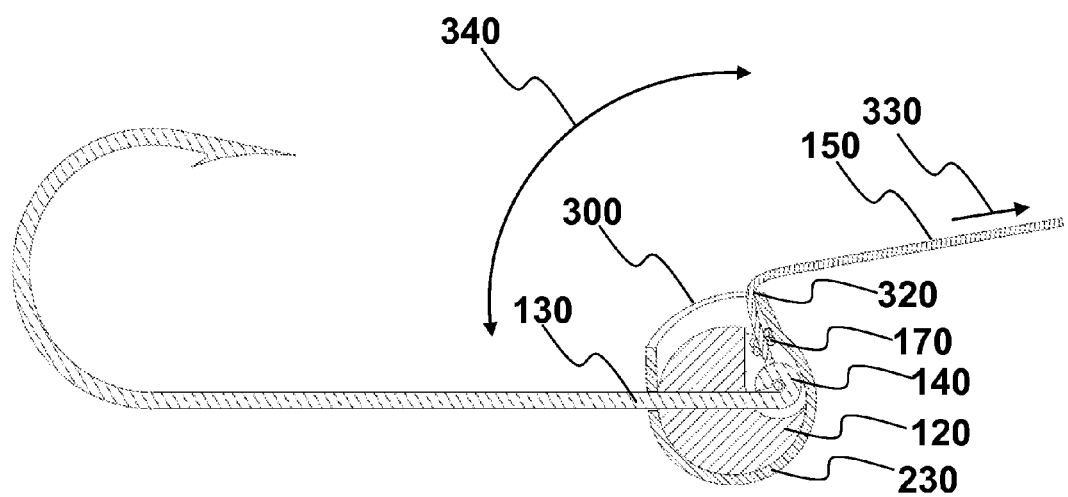
FIG. 8D is a diagrammatic median plane section view of the cover of FIG. 8A, as mounted onto a pre-existing jig-type lure. The flap element is now outward-facing and visibly reduces the size of the first aperture once mounted on the weighted head. The flap element protects the fishing line knot and also desirably creates a bend in the fishing line at a pivot point location above the hook eyelet.

Once attached to a pre-existing weighted head 120, the generally inward-facing, closed-loop flap element 300 is displaced into an outward or generally convex shape by the presence of the weighted head 120. As shown in FIG. 8C, the now-inverted flap element 300 also causes the fishing line 150 to exit the first aperture 240 at a location higher than the hook eyelet 140 of the pre-existing jig-type lure 100. Since the elastomeric membrane 230 protects the hook eyelet 140, the first aperture 240 circumscribes the fishing line 150, while the second aperture 260 circumscribes the exit of the hook shank 130 from the weighted head 120. FIG. 8D is a median plane section view of FIG. 8C, and clearly shows a bend in the fishing line 150 caused by the shape of the now-inverted flap element 300. The bend in the fishing line 150 comprises a generally upward direction component and a generally rearward direction component in defining the section of the line between the hook eyelet 140 and a pivot point 320, such that the pivot point 320 is located generally above and generally behind the hook eyelet 140. Because the cover 220 creates a new pivot point 320 of the fishing line 150 relative to the hook eyelet 140 to which the line is attached, a light, slowly-repeated pull of the fishing line 150 in a forward direction 330 causes the pre-existing jig-type lure 100 to gently rock or sway in the rocking direction 340 as shown in FIG. 8D. The creation of the pivot point 320 by the cover 220 enables an angler to make any pre-existing jig-type lure 100 exhibit this gently rocking or swaying motion without the entire lure itself having to move away from a hovering fish. The generally upward component and/or generally rearward component of the line path between the hook eyelet 140 and pivot point 320 help amplify the rocking motion described above.

Referring again to FIG. 8C, it should be evident that when mounting the fourth preferred embodiment of the cover 220 to a weighted head 120, the second aperture 260 enables the cover 220 to be slid forward along the entire hook shank 130 before the first aperture 240 elastically stretches around and onto the weighted head 120. Even with the second aperture 260, it is clear that the elastomeric membrane 230 can still be attached to or removed from the weighted head 120 of an already-tied pre-existing jig-type lure 100 without having to re-tie the line knot 170. As mentioned earlier, in the event a fighting fish pulls the cover 220 off of the weighted head 120, the second aperture 260 keeps the cover 220 slidably attached along the length of the hook 110 so that the cover 220 is not lost.

Figure 9A:
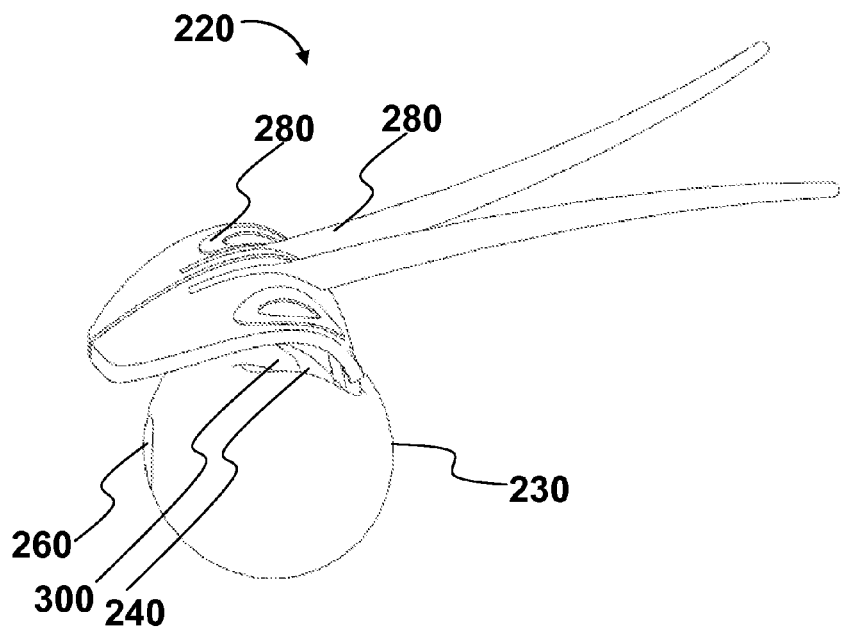
FIG. 9A is a diagrammatic perspective view of a fifth preferred embodiment of an improved cover for the weighted head of a pre-existing jig-type lure, comprising two apertures and combining additional fish-attracting elements.
Figure 9B:
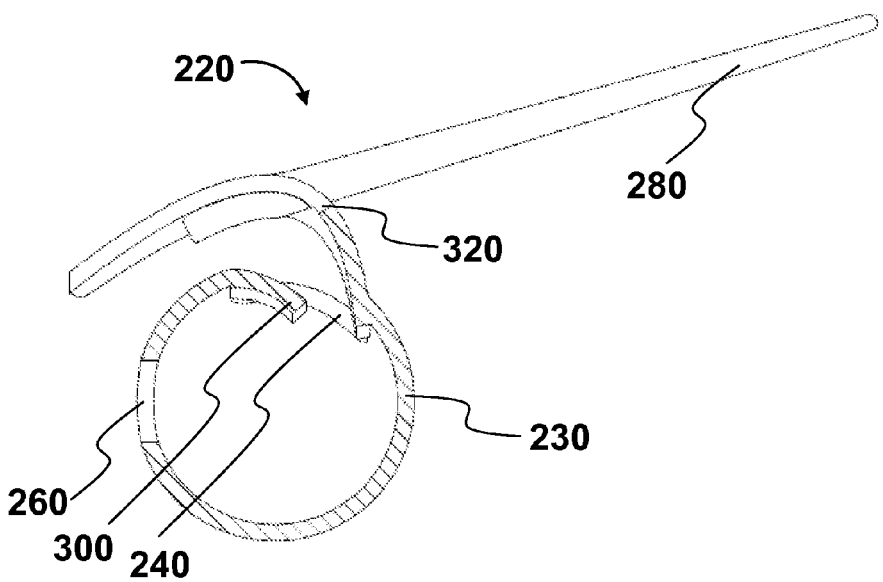
FIG. 9B is a diagrammatic median plane section view of the improved cover of FIG. 9A.
Figure 9C:
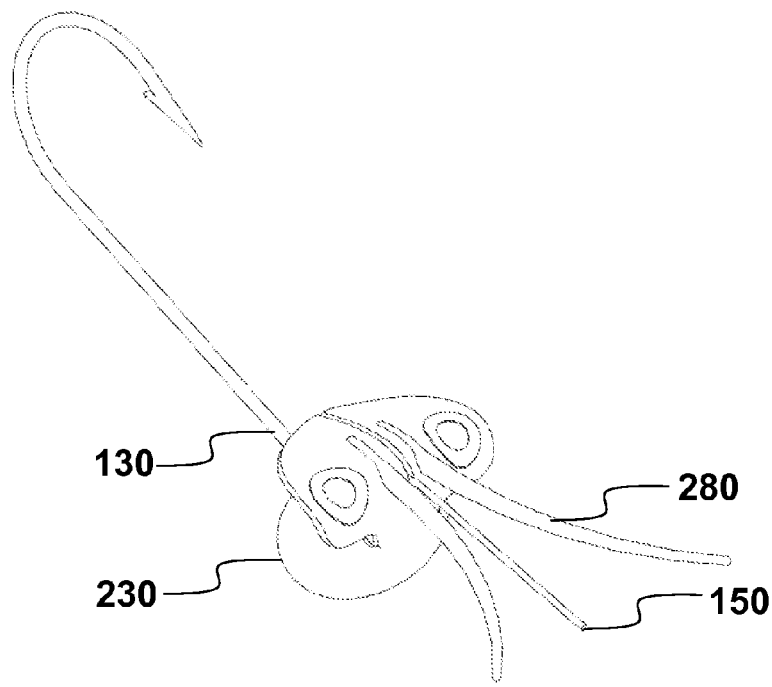
FIG. 9C is a diagrammatic perspective view of the improved cover of FIG. 8A, as mounted on a pre-existing jig-type lure. Similar to the preferred embodiment of FIG. 8D, the improved cover creates a desirable bend in the fishing line and also protects the fishing line knot.
Figure 9D:
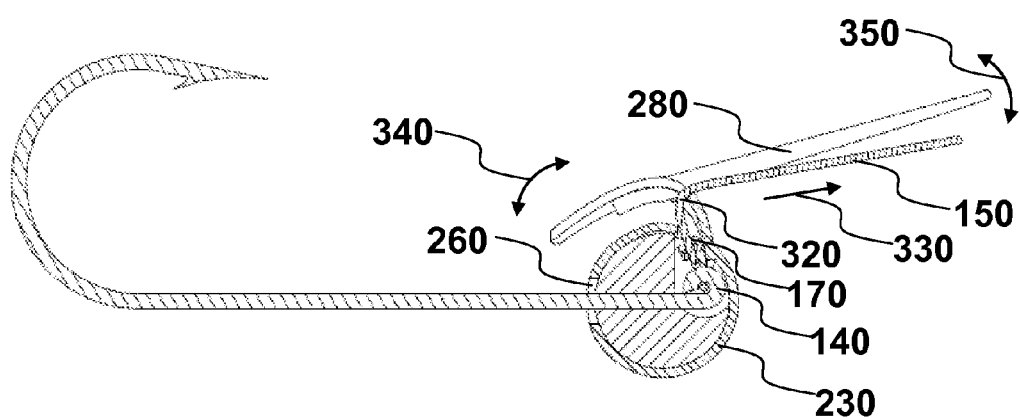
FIG. 9D is a diagrammatic median plane section view of the arrangement of FIG. 9C. A twitching motion of the fishing line can cause a fluttering motion of the fish-attracting elements, without the entire pre-existing jig-type lure itself moving forward.

The ability of the improved cover 220 to form a higher pivot point 320 of an attached fishing line 150 relative to the hook eyelet 140 of a pre-existing jig-type lure 100 further enables other novel types of fish-attracting behavior. In FIG. 9A, a fifth preferred embodiment is shown, wherein the improved cover 220 comprises multiple fish-attracting elements 280 in the form of eyes and antennae of a small creature. In the section view of FIG. 9B, the first aperture 240, flap element 300, second aperture 260, and pivot point 320 are shown. FIG. 9C is shows a view of the cover 220 attached to a pre-existing jig-type lure 100, wherein the fish-attracting elements 280 of the cover 220 are more visible. In the median plane section view of FIG. 9D, the pivot point 320 created by the cover 220 is similar to that of FIG. 8D in that the pivot point 320 is located generally above and generally behind the hook eyelet 140. Any slight twitching of the fishing line in a forward direction 330 causes the elongated fish-attracting elements 280 to flutter in an undulating direction 350. The pivot point 320, created simply by the addition of the improved cover 220, enables any pre-existing jig-type lure 100 to display the unique fluttering behavior of one or more fish-attracting elements 280. Similar to the arrangement in FIG. 8D, the pivot point 320 in FIG. 9D enables a repeatedly slow pull or tug of the fishing line 150 to cause a slow swaying motion of the lure in the rocking direction 340 as well. Simply by attaching the improved cover 220 to a pre-existing jig-type lure 100 and by combining or alternating light twitches and slow tugs of the fishing line 150, and angler can better animate a stationary lure and tempt a hovering fish in new and unique ways.

Figure 10A:
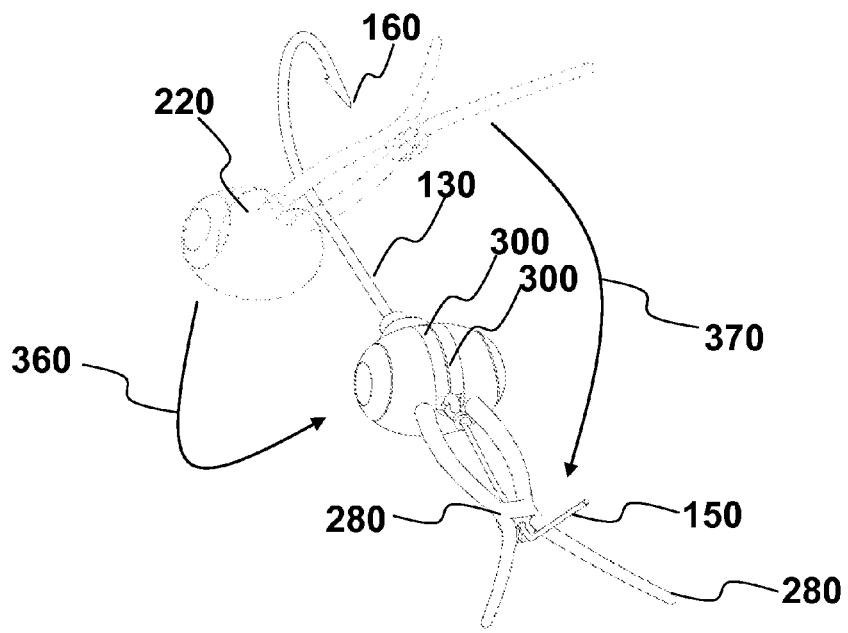
FIG. 10A is diagrammatic perspective view of a sixth preferred embodiment of a improved cover, as attached to the weighted head of a pre-existing jig-type lure, wherein a fish-attracting element comprises a means to couple to a fishing line to the improved cover at a location ahead of the weighted jig head. The cover can be assembled to the weighted head without having to untie the fishing line knot from an already-tied jig-type lure, and such an assembly procedure is indicated by the arrows in the figure.

A sixth preferred embodiment of an improved cover 220 is shown in FIG. 10A, wherein the flap elements 300 again help conceal the weighted head 120 after the cover 220 is elastically stretched onto a pre-existing jig-type lure 100, and an appendage-shaped fish-attracting element 280 comprises a means for slidably mounting the fish-attracting element 280 onto the fishing line 150. The dotted lines in FIG. 10A help illustrate the method for mounting the cover 220 to an already-tied, pre-existing jig-type lure 100. The hook shank 130 and hook point 160 are first slid through the pair of fish-attracting elements 280, and the elastomeric membrane 220 is stretched around and onto the weighted head 120 in a first attachment direction 360. The fish-attracting elements 280, having been slid forward around the weighted head 120 to be located in front of the weighted head 120, are then pushed down over the fishing line in the second attachment direction 370. The advantage of the fish-attracting element 280 being mounted in this manner is that if the fishing line 150 is lightly twitched, the fish-attracting element 280 correspondingly flutters with a much more amplified effect as compared to the fish-attracting element 280 of FIG. 9D, all while the weighted head 120 remains in a stationary position. The improved cover 220 again enables the pre-existing jig-type lure 100 with the ability to further tempt nearby fish without the entire lure itself having to move forward or away from the nearby fish. The advantage of FIG. 10A over the prior art of FIG. 4 is that the entire cover 220 can be removed from an already-tied pre-existing jig-type lure 100 without having to cut the fishing line 150, unlike the prior-art cover 220 of FIG. 4, which remains slidably attached to a fishing line 150 through the pair of holes 290. It is evident that the removal of the cover 220 in FIG. 10A is achieved simply by the reversal of the attachment method described above.

Figure 10B:
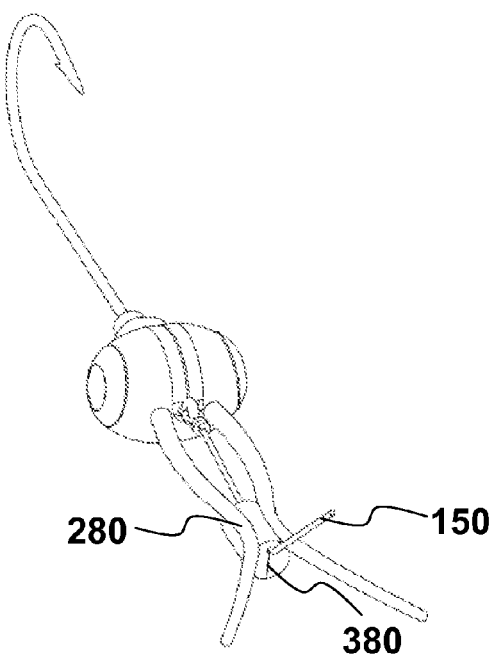
FIG. 10B is diagrammatic perspective view of a similar preferred embodiment of a improved cover attached to a pre-existing jig-type lure, wherein the line-coupling means of the fish-attracting element is in the form of a generally hollow, slotted portion.
Figure 10C:
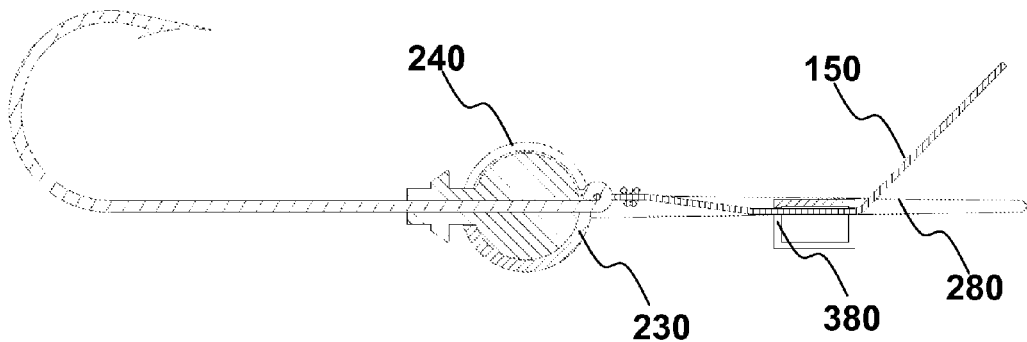
FIG. 10C is a diagrammatic median plane section view of the cover of FIG. 10B, as mounted onto a weighted jig head.
Figure 10D:
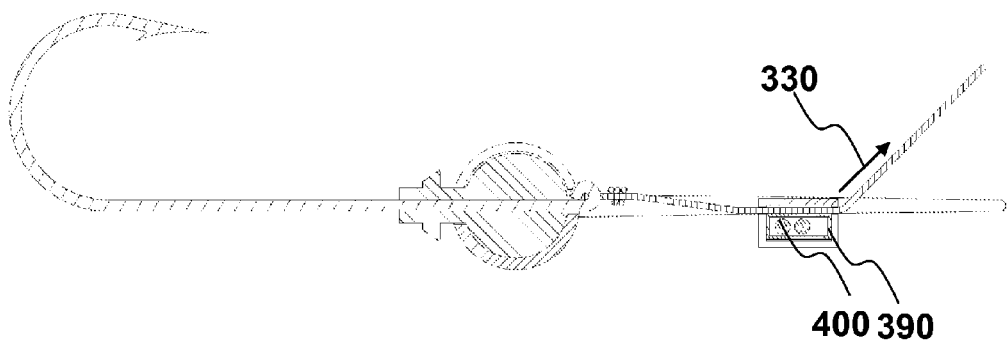
FIG. 10D is a diagrammatic median plane section view similar to FIG. 10C, with a pre-existing rattle member inserted into the generally hollow portion.

FIG. 10B and FIG. 10C show a perspective view and median plane section view, respectively, of a mounted improved cover 220 similar to FIG. 10A, but where the fish-attracting element 280 contains a portion generally in the shape of a hollow cylinder. The fishing line 150 passes through a slotted portion of the fish-attracting element, similar to the arrangement of FIG. 10A. An advantage of a fish-attracting element 280 having a generally cylindrical-shaped slotted portion is that a rattle chamber 390 with at least one rattle member 400 can be inserted into the cylindrically-shaped slotted portion, as detailed in FIG. 10D. Any twitch or jiggling movement of the fishing line in the generally forward direction 330 results in fish attracting sounds without the entire lure moving forward. In other words, the pre-existing jig-type lure 100 can remain at a stationary location on a bottom underwater surface while the improved cover 220 simultaneously enables fish-attracting sounds to be emitted with each twitch of the fishing line 150.

Figure 10E:
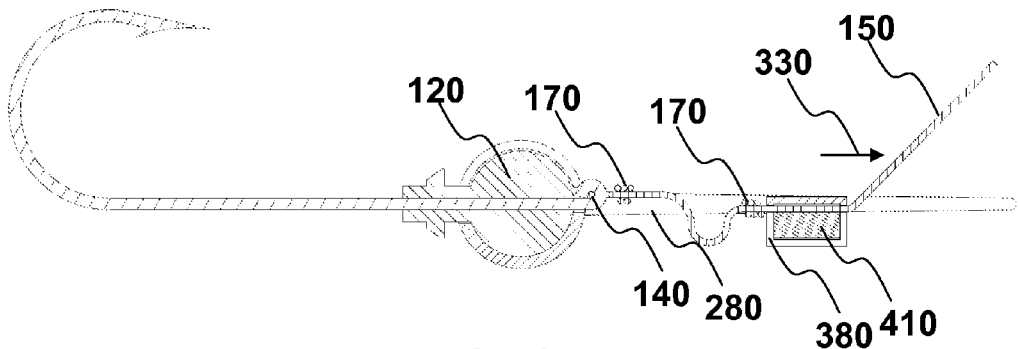
FIG. 10E is a diagrammatic median plane section view similar to FIG. 10D, with a pre-existing weight member inserted into the generally hollow portion.

Alternatively, the rattle chamber 390 can be replaced with a solid weight 410, as shown in FIG. 10E. With the improved cover 220 attached like shown in FIG. 10E, the pre-existing jig-type lure 100 can then be rigged with a second knot 170 in the fishing line 150 located just behind the solid weight 410, with the section of fishing line 150 between each knot 170 being longer than the distance between the solid weight 410 and hook eyelet 140. Jerking the line taut in a forward direction 330 causes the solid weight 410 to lunge forward and briefly stretch the antenna-shaped fish-attracting elements 280 a predetermined distance, at which point the elasticity of the fish-attracting elements reaches 280 a temporary maximum and generates a reaction force pulling the weighted head 120 also in the forward direction 330. This alternating "expanding and then contracting" motion, as the cyclical jerks of the fishing line 150 create an alternating distance between the solid weight 410 and the weighted head 120, creates an "inchworm-type" hopping movement of the pre-existing jig-type lure 100. A pre-existing jig-type lure 100 cannot exhibit such an inchworm-type behavior unless the improved cover 220 of FIG. 10E is attached.

Figure 11A:
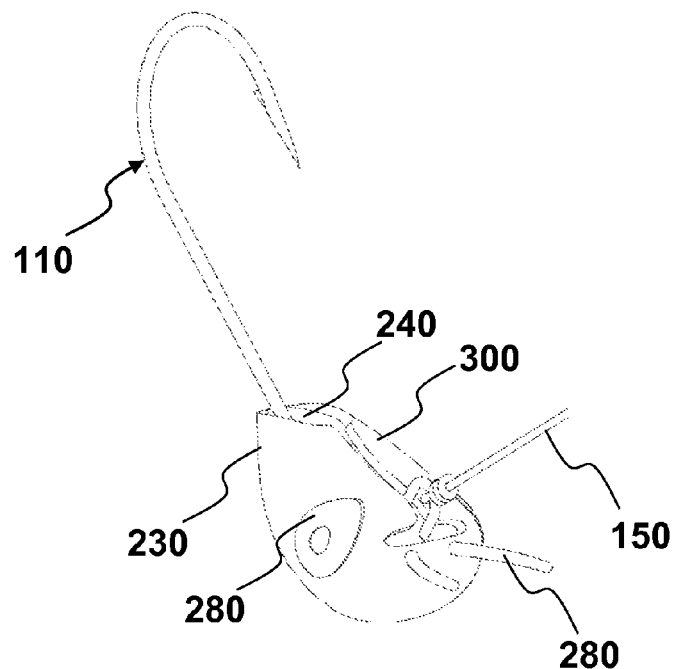
FIG. 11A is a diagrammatic perspective view of a seventh preferred embodiment of a improved cover for the weighted head of a pre-existing jig-type lure, wherein the cover wraps around a portion of the pivotally-coupled hook to enable a more spring-like motion of the hook as the lure is hopped along a bottom underwater surface.
Figure 11B:
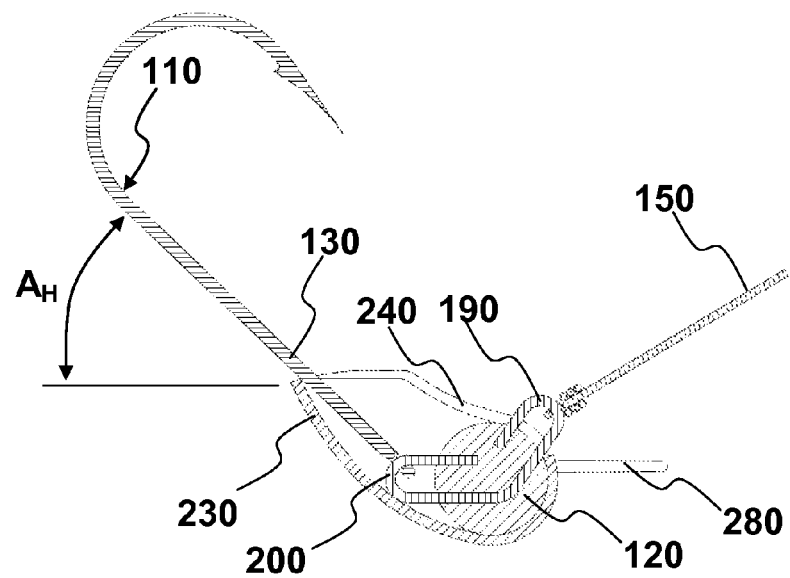
FIG. 11B is a diagrammatic median plane section view of the cover of FIG. 11A, as mounted onto a pre-existing jig-type lure.

A seventh preferred embodiment of an improved cover 220 is shown attached to a pre-existing jig-type lure 100 in FIG. 11A and FIG. 11B. The pre-existing jig-type lure 100 shown is that of the pivotally-coupled hook type, as described in FIG. 1C. Similar to other preferred embodiments, the cover 220 comprises at least one novel flap element 300 to conceal more of the weighted head 120 versus prior art. Because the hook 110 is pivotally coupled to the weighted head 120 through the second wire form eyelet 200 of the wire form member, the improved cover 220 can be sized to elastically support the hook 110 at a pre-determined rest angle $A_H$. For example, if the weighted head 120 is held fixed and the hook 110 is pulled in a generally downward direction that decreases $A_H$ and then is released, the elastic properties of the membrane act to swing or pull the hook 110 back to the rest position or neutral $A_H$ position. This ability of the elastomeric membrane 220 to enable a spring-type behavior of a pivotally-coupled hook 110 creates several advantages. First, if an angler mounts a heavy soft body member or bait to the hook 110, then the pre-existing jig-type lure 100 can now exhibit a swaying motion, or cyclically-varying $A_H$, with each periodic jerk of the fishing line 150 due to the heavy soft body cyclically stretching the portion of the elastomeric membrane 230 that extends to support the hook shank 130. Second, any fish that bites the lure will feel a springy-type deformation of the lure due to the stretchable properties of the elastomeric membrane 220 supporting the hook shank 130. The ability of the cover 220 to enable a soft, chewy-type deformation of a pre-existing jig-type lure 100 creates more lifelike tactile feedback for a biting fish versus that of a rigid lure. In other words, fish expect soft creatures to bend and flex in certain natural ways when being consumed, and this more-lifelike collapsibility or deformation of a pre-existing jig-type lure 100 is better enabled through the addition of the improved cover 220.

Figure 12:
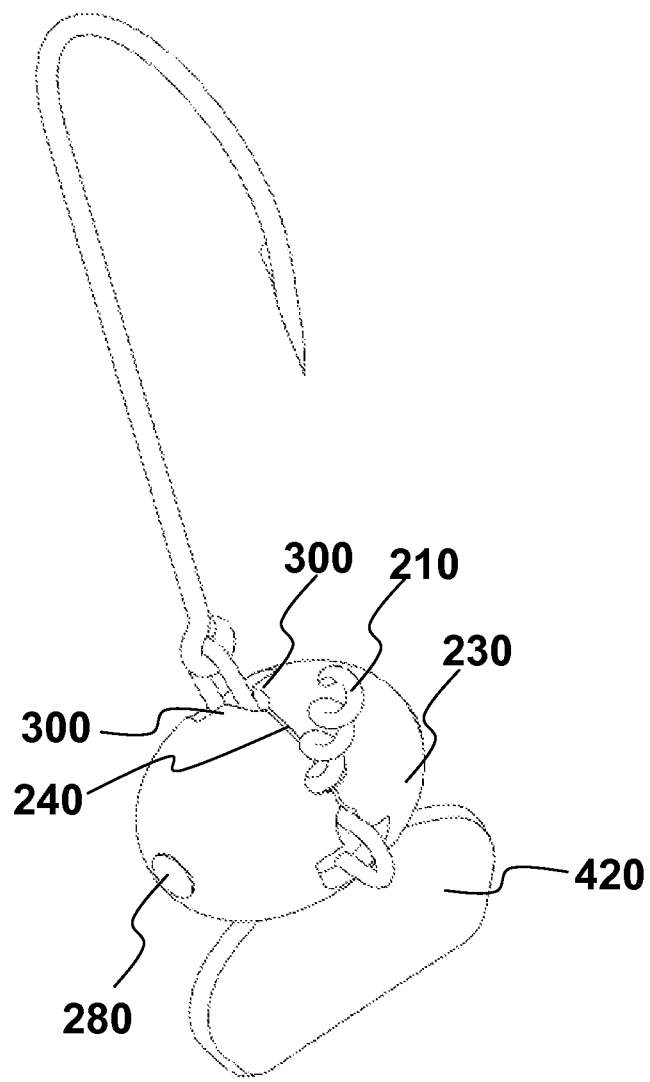
FIG. 12 is a diagrammatic perspective view of an eighth preferred embodiment of an improved cover mounted to a pre-existing jig-type lure, wherein a generally concave surface is integrated into the improved cover to help create visibly different motion or behavior when the lure is retrieved.

FIG. 12 illustrates an eighth preferred embodiment of an improved cover 220, wherein a portion of the elastomeric membrane 230 is formed into a generally concave surface 420. As a result of the generally concave surface 420 portion of the elastomeric membrane 230, the cover 220 enables a pre-existing jig-type lure 100 to exhibit a wobbly or oscillating-type motion when the attached pre-existing jig-type lure 100 is retrieved by an angler at a constant speed. Although a concave surface 420 is shown, a generally flat surface portion of the elastomeric membrane 230 can also enable a pre-existing jig-type lure 100 to exhibit a similar wobbling or oscillating-type swimming motion.

Figure 13A:
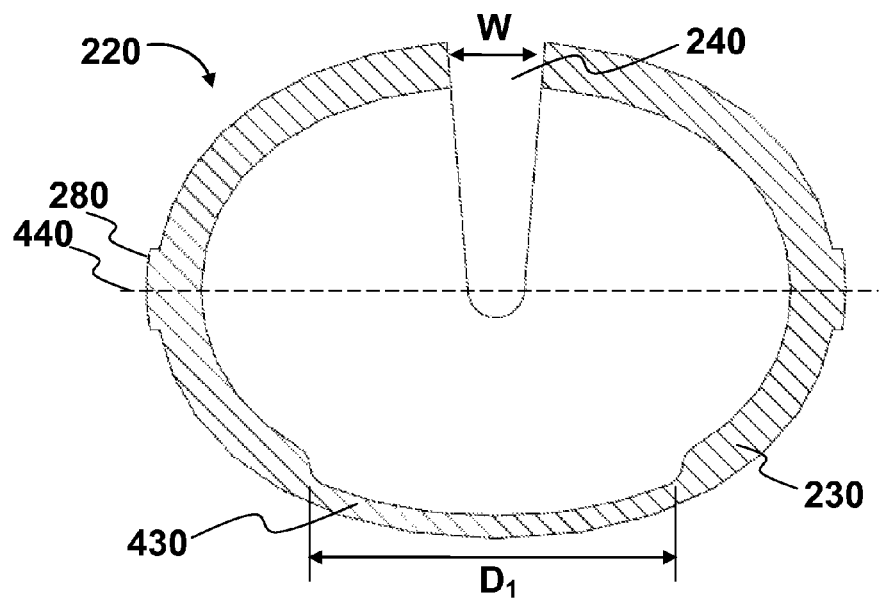
FIG. 13A is a diagrammatic transverse plane section view of a ninth preferred embodiment of an improved cover for the weighted head of a pre-existing jig-type lure, comprising a first aperture and a thin portion of the elastomeric membrane optimally located generally opposite the first aperture.
Figure 13B:
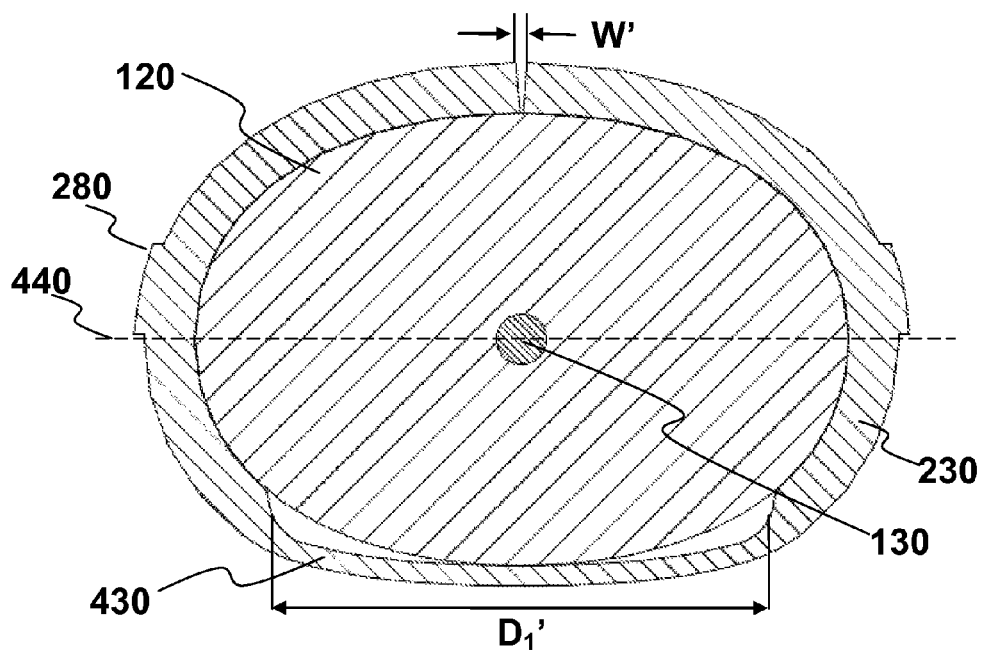
FIG. 13B is a diagrammatic transverse plane section view of the cover of FIG. 13A, as mounted onto the weighted head of a pre-existing jig-type lure, wherein the thin portion of the elastomeric membrane desirably stretches more than the surrounding thicker portion of the elastomeric membrane, causing a decrease the width of the first aperture.

While it may seem counterintuitive at first, it is possible for the cover 220 to decrease the opening area of the first aperture 240 simply through the act of expanding around or elastically stretching onto a pre-existing weighted head 120. Said differently, an expansion of a first portion of the elastomeric membrane 230 can directly cause a contraction of a second portion of the elastomeric membrane 230. Such behavior is enabled by the ninth preferred embodiment of an improved cover 220, through which a transverse section view is shown in FIG. 13A. In FIG. 13A, the cover 220 consists of an elastomeric membrane 230, a first aperture 240 having an un-mounted width W and at least one fish-attracting element 280, similar to the construction of previous preferred embodiments. The example fish-attracting element 280 for this preferred embodiment is an eye of a small creature. Although one or more flap elements 300 are not required for this preferred embodiment, one or more flap elements 300 can be integrated into the elastomeric membrane 280, if desired. FIG. 13B shows the elastomeric membrane in the stretched shape, as mounted to a weighted head 120 of a pre-existing jig-type lure 100. To aid in describing how the thin portion 430 causes the elastomeric membrane 230 to expand in an asymmetric fashion such that size of the first aperture 240 decreases, a horizontal plane 440 is shown in FIG. 13A and FIG. 13B. The horizontal plane 440 divides the elastomeric membrane 230 into a two portions—a first portion comprising the first aperture 240, and a generally opposite portion. To enable the improved cover 220 to decrease the width W of the first aperture 240 simply by the act of elastically stretching around a weighted head 120, a generally thin portion 430 of the membrane, having dimension $D_1$, is optimally located within the generally opposite portion of the elastomeric membrane 230. The thin portion 430 can be any thickness, but should have a thickness generally less than the substantial remainder of the surrounding elastomeric membrane 230 order to better enable the decrease of the width W of the first aperture 240 once the cover 220 is mounted on a weighted head 120. When the elastic membrane 230 expands to fit onto a larger weighted head 120, as shown in FIG. 13B, the less-stiff, weaker thin portion 430 undergoes a larger dimensional increase compared to the thicker—and more rigid—remaining portion of the membrane. Since the location of the thin portion 430 is in the portion of the elastomeric membrane 230 located generally opposite that of the first aperture 240, the expanding dimension $D_1$ of the thin portion 430 acts to decrease the width W of the first aperture. Compared to FIG. 13A, the thin portion 430 enables the following to occur once the cover 220 elastically expands to mount onto a larger weighted head: the length $D_1$ of the thinner first portion increases to length $D_1'$, the eye-shaped fish-attracting element 280 shifts slightly relative to the horizontal plane 440, and the width W of the first aperture decreases to width W'. It should again be noted that the eye-shaped fish-attracting element 280 is not required, but is simply shown to help illustrate the stretching behavior of an elastomeric membrane 230 comprising an optimally-located thin portion 430.

Figures 13C, 13D:
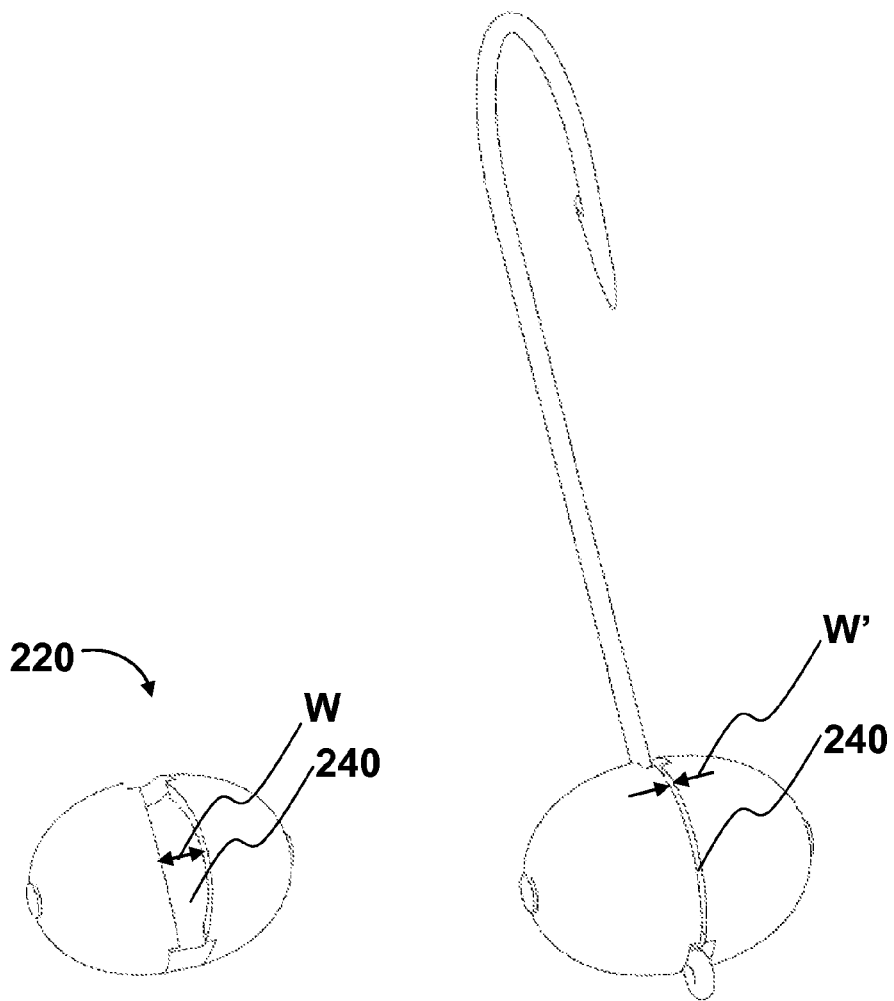
FIG. 13C is a diagrammatic perspective view of the cover of FIG. 13A, in the un-mounted condition.
FIG. 13D is a diagrammatic perspective view of the cover of FIG. 13A, as mounted onto the weighted head of a pre-existing jig-type lure.

FIG. 13C and FIG. 13D are perspective views illustrating how the improved cover 220 of FIG. 13A appears both in the un-mounted and mounted conditions. In the un-mounted condition, the width W of the first aperture 240 is clearly visible. However, once the cover 220 stretches to mount over a larger weighted head 120, the elastically weaker, thin portion 430 stretches more than the surrounding thicker portion of the membrane, and this forces the width W of the first aperture 240 to decrease to the mounted width W'. The mounted appearance of the improved cover 220 in FIG. 13D is much more continuous and more pleasing compared to the mounted appearance of the prior-art cover 220 of FIG. 2B.

Figure 14A:
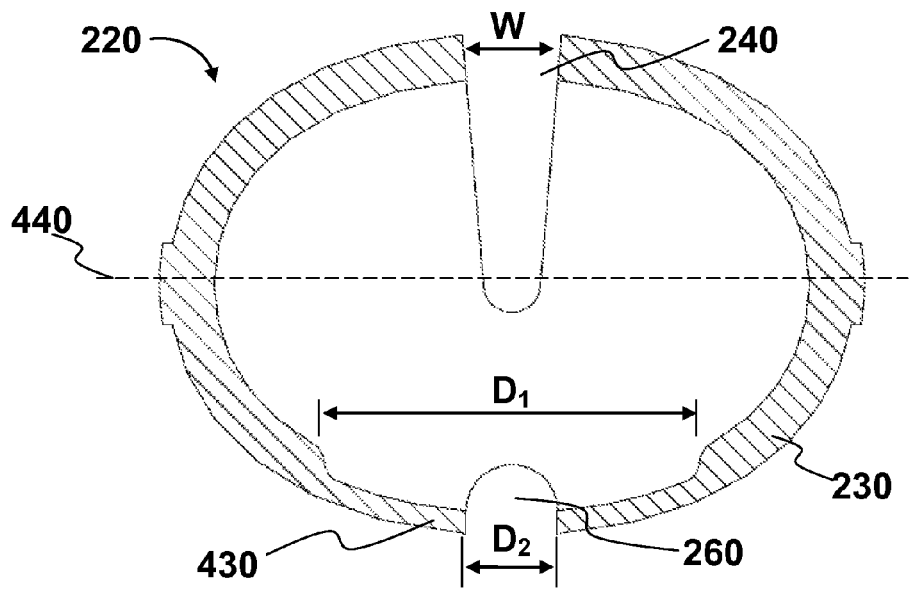
FIG. 14A is a diagrammatic transverse plane section view of a tenth preferred embodiment of an improved cover for the weighted head of a pre-existing jig-type lure, similar to the ninth preferred embodiment, but with the addition of a second aperture to enable a more elastic thin portion.
Figure 14B:
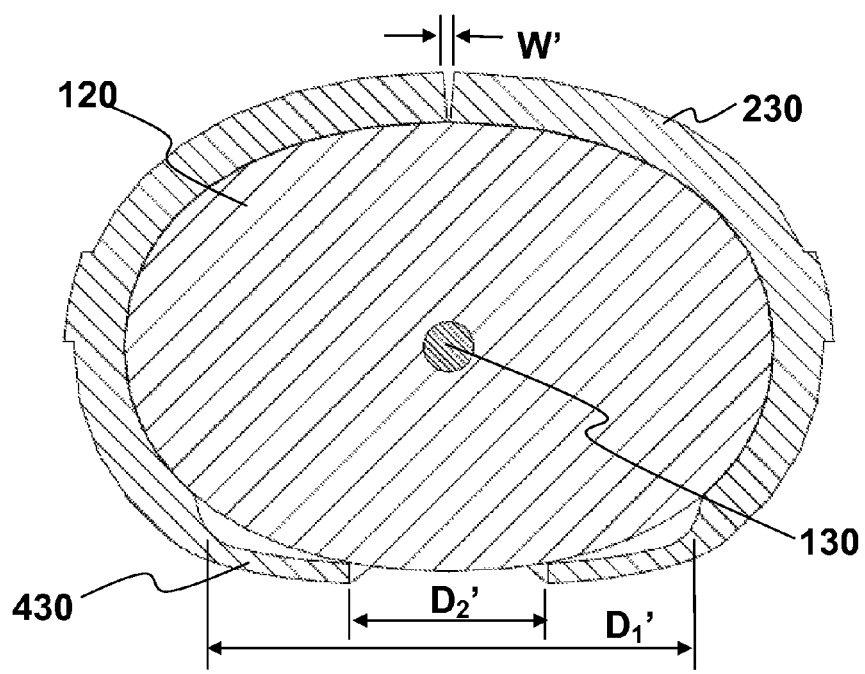
FIG. 14B is a diagrammatic transverse plane section view of the cover of FIG. 14A, as mounted onto the weighted head of a pre-existing jig-type lure.

FIG. 14A is a transverse plane section view of a tenth preferred embodiment of an improved cover 220 for a pre-existing jig-type lure 100, similar to the ninth preferred embodiment of FIG. 13A, wherein the thin portion 430 is made even more elastically weaker though the addition of a second aperture 260 having dimension $D_2$ and passing through the thin portion 430. Similar to the improved cover 220 of FIG. 13A, once the cover 220 of FIG. 14A elastically expands to mount onto a weighted head 120, the overall effect is similar to that of FIG. 13B. Specifically, the second aperture 260 increases in size from $D_2$ to size $D_2'$, and the width W of the first aperture desirably decreases to the much less noticeable width W'.

It should be noted that the thickness of the thin portion 430 can be reduced to a value of zero, such that the thin portion 430 becomes simply a through hole, or second aperture 260. In other words, the presence of just a second aperture 260 only, located in the opposite portion of the elastomeric membrane 230 relative to the first aperture 240, is sufficient to enable the same closing or reduction of the first aperture width—from W to W'—upon the cover 220 being elastically mounted onto a pre-existing weighted head 120.

Although a single thin portion 430 is shown, two or more thin portions 430 can be positioned generally adjacent to each other, with each pair of thin portions 430 separated by a thicker portion. Such an arrangement of alternating thinner portions 430 and alternating thicker portions can generate the appearance of a webbed surface, dimpled surface, hatched surface, or similar, and have the same general effect when the improved cover 220 is elastically mounted onto a weighted head 100 of causing the width W of the first aperture 240 to decrease to width W'.

In summary, compared to the cover of prior art, the improved cover hides more of the weighted head surface upon being mounted onto a pre-existing jig-type lure. The act of stretching the elastomeric membrane into the expanded mounted shape, when attaching the cover onto a pre-existing weighted head, causes the opening area of the first aperture to decrease through the use of one or more flap elements, a generally thin portion located generally opposite the first aperture, a second aperture located generally opposite the first aperture, or any combination thereof. The cover makes any pre-existing jig-type lure even more appealing to a fish, as evident by comparing FIG. 5D, FIG. 9C, FIG. 10A, and FIG. 11A, to the pre-existing jig-type lures of FIGS. 1A-1C. In addition, the first aperture is of a predetermined size and shape which enables easy interchangeability of the improved cover and allows the cover to be attached to or removed from the weighted head of a pre-existing jig-type lure without untying the fishing line.

There is no required size, shape, or orientation of any aperture when the improved cover comprises one or more flap elements, at least one thin portion located generally opposite the first aperture, a second aperture located generally opposite the first aperture, or any combination thereof. The first aperture is not restricted to being located on generally the top portion of the elastomeric membrane, as it may instead be located generally on the bottom portion of the membrane as long as it is dimensioned to enable the elastic attachment and removal of the cover without having to detach the fishing line from an already-tied, pre-existing jig-type lure.

The elastomeric membrane of the can be made from any soft elastomeric material that is commonly used in making artificial fishing lures. It should be known that some or all of the improved cover can be made from one or a combination of the following materials: open cell foam, closed cell foam, leather, felt, fabric, heat shrink tubing material, natural rubber, a synthetic rubber, softer durometer elastomer, harder durometer elastomer, a thermoplastic elastomer, a thermoplastic vulcanizate, a thermoplastic polyurethane, a thermoplastic olefin, a thermoplastic polymer, plastisol, and the like. Also, one advantage of using an absorbable material, such as open cell foam, for all of or a portion of the elastomeric membrane is that chemical fish attractants can be applied to the absorbable material, providing a means for the chemical attractants to slowly disperse in the water surrounding the lure. Multiple durometers of a given material can also be combined to construct the improved cover.

Many features can be considered fish-attracting elements, such as any exterior anatomical feature on an insect, amphibian, reptile, fish, mollusk, crustacean, or other small invertebrate animal. In addition, the improved cover can be made of different colors and can include plastic or metallic reflective elements such as glitter or similar, include an embedded rattle, comprise a rattle attachment, or similar.

The improved cover consists of a elastomeric membrane which can also include one or more apertures enabling removable assembly of the cover onto a weighted head, along with one or more flap elements, one or more optimally-located thin portions, one or more optimally-located apertures, or any combination thereof, to cause the opening area of the first aperture to decrease upon the cover being mounted into a pre-existing weighted head. The improved cover can further comprise at least one fish-attracting element to enable the corresponding pre-existing jig-type lure look and feel more appealing to a fish. It should also be apparent that further means to anchor the improved cover can include utilizing any additional protrusions found on a pre-existing weighted head, such that the pre-existing additional protrusions pass through one or more apertures of the elastomeric membrane.

It is also obvious that the exterior surface of the elastomeric membrane can be engraved with any texture or pattern so as to create a desirably different visual appearance or different tactile feeling as compared to a smooth exterior surface. In addition, it is possible for the elastomeric membrane to be modular in construction or made of more than one member or section.

It should also be understood that any preferred embodiment of the improved cover can be added to a pre-existing jig-type lure simply by elastically mounting the cover onto the pre-existing weighted head. In other words, an angler would not need to purchase new jig-type lures in order to be able to use one or more of the preferred embodiments.

While certain preferred embodiments have been described and shown in the accompanying drawings, it is to be understood that such preferred embodiments are merely illustrative of, and not restrictive on, the broad invention. Furthermore, it is to be understood that this invention shall not be limited to the preferred embodiments shown and described, as various modifications or changes will be apparent to those of ordinary skill in the art without departing from the spirit and scope of the preferred embodiments as claimed. It is intended that the scope of the invention be defined by the following claims and their equivalents.

What is claimed is:

1. A cover for a pre-existing jig-type fishing lure having a hook embedded within a weighted head, wherein the hook has an eyelet which protrudes from a first location on the weighted head for the attachment of a fishing line thereto, and a hook shank which protrudes from a second location on the weighted head, comprising:
    an elastomeric membrane generally defining a generally hollow cavity and having a first aperture, wherein the first aperture has a predetermined open area;
    wherein the first aperture circumscribes the eyelet or the fishing line;
    wherein the membrane further comprises at least one flap element extending generally inward into the generally hollow cavity formed by the elastomeric membrane, whereupon attachment of the membrane to the weighted head the at least one flap element folds into a generally extended direction and is supported by the weighted head, wherein the at least one flap element decreases the open area of the first aperture when the cover is mounted onto the weighted head;
    wherein the cover is dimensioned so as to stretch and fit over the weighted head and to be retained solely by the elasticity of the membrane; and
    wherein the cover can be attached to or removed from the weighted head while a fishing line is tied to the eyelet.

2. The cover for a pre-existing jig-type fishing lure according to claim 1, wherein the membrane further comprises at least one element for attracting fish.

3. The cover for a pre-existing jig-type fishing lure according to claim 2, wherein the at least one element for attracting fish is in the shape of an anatomical feature of an insect, amphibian, reptile, fish, mollusk, crustacean, or small invertebrate animal.

4. The cover for a pre-existing jig-type fishing lure according to claim 1, wherein the elastomeric membrane comprises a combination of more than one material.

5. The cover for a pre-existing jig-type fishing lure according to claim 4, wherein the combination of materials is selected from a group consisting of open cell foam, closed cell foam, leather, felt, fabric, heat shrink tubing, natural rubber, synthetic rubber, softer durometer elastomer, harder durometer elastomer, thermoplastic elastomer, a thermoplastic vulcanizate, thermoplastic polyurethane, a thermoplastic olefin, thermoplastic polymer, and plastisol.

6. The cover for a pre-existing jig-type fishing lure according to claim 1, wherein the first aperture extends to also circumscribe the shank.

7. The cover for a pre-existing jig-type fishing lure according to claim 1, wherein the at least one element for attracting fish comprises a slot for the passage of the fishing line therethrough, wherein the at least one element for attracting fish is enabled to move independently of the weighted head by twitching the fishing line.

8. The cover for a pre-existing jig-type fishing lure according to claim 1, wherein the membrane comprises a generally concave or flat surface.

9. The cover for a pre-existing jig-type fishing lure according to claim 1, wherein the membrane comprises a generally thin portion located generally opposite the first aperture.

10. The cover for a pre-existing jig-type fishing lure according to claim 1, wherein the membrane comprises a second aperture located generally opposite the first aperture.

11. The cover for a pre-existing jig-type fishing lure according to claim 1, wherein the membrane further comprises plastic or metallic reflective elements.

12. The cover for a pre-existing jig-type fishing lure according to claim 1, wherein the membrane comprises a texture or pattern.

13. A cover for a pre-existing jig-type fishing lure having a hook embedded within a weighted head, wherein the hook has an eyelet which protrudes from a first location on the weighted head for the attachment of a fishing line thereto, and a hook shank which protrudes from a second location on the weighted head, comprising:
   an elastomeric membrane generally defining a generally hollow cavity and having a first aperture, wherein the first aperture has a predetermined open area;
   wherein the first aperture circumscribes the fishing line;
   wherein the first aperture is dimensioned to create a substantial bend in the fishing line, wherein the bend defines a pivot point of the line relative to the eyelet such that the pivot point is located generally above the eyelet;
   wherein the membrane further comprises at least one flap element extending generally inward into the generally hollow cavity formed by the elastomeric membrane, whereupon attachment of the membrane to the weighted head the at least one flap element folds into a generally extended direction and is supported by the weighted head, wherein the at least one flap element decreases the open area of the first aperture when the cover is mounted onto the weighted head;
   wherein the cover is dimensioned so as to stretch and fit over the weighted head and to be retained solely by the elasticity of the membrane; and
   wherein the cover can be attached to or removed from the weighted head while a fishing line is tied to the eyelet.

14. The cover for a pre-existing jig-type fishing lure according to claim 13, wherein the membrane further comprises at least one element for attracting fish.

15. The cover for a pre-existing jig-type fishing lure according to claim 14, wherein the at least one element for attracting fish is in the shape of an anatomical feature of an insect, amphibian, reptile, fish, mollusk, crustacean, or small invertebrate animal.

16. The cover for a pre-existing jig-type fishing lure according to claim 13, wherein the elastomeric membrane comprises a combination of more than one material.

17. The cover for a pre-existing jig-type fishing lure according to claim 16, wherein the combination of materials is selected from a group consisting of open cell foam, closed cell foam, leather, felt, fabric, heat shrink tubing, natural rubber, synthetic rubber, softer durometer elastomer, harder durometer elastomer, thermoplastic elastomer, a thermoplastic vulcanizate, thermoplastic polyurethane, a thermoplastic olefin, thermoplastic polymer, and plastisol.

18. The cover for a pre-existing jig-type fishing lure according to claim 13, wherein the first aperture extends to also circumscribe the shank.

19. The cover for a pre-existing jig-type fishing lure according to claim 13, wherein the at least one element for attracting fish comprises a slot for the passage of the fishing line therethrough, wherein the at least one element for attracting fish is enabled to move independently of the weighted head by twitching the fishing line.

20. The cover for a pre-existing jig-type fishing lure according to claim 13, wherein the membrane comprises a generally concave or flat surface.

21. The cover for a pre-existing jig-type fishing lure according to claim 13, wherein the membrane comprises a generally thin portion located generally opposite the first aperture.

22. The cover for a pre-existing jig-type fishing lure according to claim 13, wherein the membrane comprises a second aperture located generally opposite the first aperture.

23. The cover for a pre-existing jig-type fishing lure according to claim 13, wherein the membrane further comprises plastic or metallic reflective elements.

24. The cover for a pre-existing jig-type fishing lure according to claim 13, wherein the membrane comprises a texture or pattern.

25. A cover for a pre-existing jig-type fishing lure having a hook embedded within a weighted head, wherein the hook has an eyelet which protrudes from a first location on the weighted head for the attachment of a fishing line thereto, and a hook shank which protrudes from a second location on the weighted head, comprising:
   an elastomeric membrane defining a generally hollow cavity, wherein the hollow cavity has a first portion and a generally opposite portion;
   a first aperture generally located in the first portion, wherein the first aperture has a predetermined open area;
   wherein the membrane further comprises a generally thin portion located in the generally opposite portion, wherein dimensional expansion of the thin portion upon elastically mounting the membrane to the weighted head causes a decrease in the open area of the first aperture;
   wherein the cover is dimensioned so as to stretch and fit over the weighted head and to be retained solely by the elasticity of the membrane; and
   wherein the cover can be attached to or removed from the weighted head while a fishing line is tied to the eyelet.

26. The cover for a pre-existing jig-type fishing lure according to claim 25, wherein the membrane further comprises at least one element for attracting fish.

27. The cover for a pre-existing jig-type fishing lure according to claim 26, wherein the at least one element for attracting fish is in the shape of an anatomical feature of an insect, amphibian, reptile, fish, mollusk, crustacean, or small invertebrate animal.

28. The cover for a pre-existing jig-type fishing lure according to claim 25, wherein the elastomeric membrane comprises a combination of more than one material.

29. The cover for a pre-existing jig-type fishing lure according to claim 28, wherein the combination of materials is selected from a group consisting of open cell foam, closed cell foam, leather, felt, fabric, heat shrink tubing, natural rubber, synthetic rubber, softer durometer elastomer, harder durometer elastomer, thermoplastic elastomer, a thermoplastic vulcanizate, thermoplastic polyurethane, a thermoplastic olefin, thermoplastic polymer, and plastisol.

30. The cover for a pre-existing jig-type fishing lure according to claim 25, wherein the first aperture extends to also circumscribe the shank.

31. The cover for a pre-existing jig-type fishing lure according to claim 25, wherein the at least one element for attracting fish comprises a slot for the passage of the fishing line therethrough, wherein the at least one element for attracting fish is enabled to move independently of the weighted head by twitching the fishing line.

32. The cover for a pre-existing jig-type fishing lure according to claim 25, wherein the membrane comprises a generally concave or flat surface.

33. The cover for a pre-existing jig-type fishing lure according to claim 25, wherein the membrane further comprises at least one flap element extending generally inward into the generally hollow cavity formed by the elastomeric membrane.

34. The cover for a pre-existing jig-type fishing lure according to claim 25, wherein the membrane comprises a second aperture located generally opposite the first aperture.

35. The cover for a pre-existing jig-type fishing lure according to claim 25, wherein the membrane further comprises plastic or metallic reflective elements.

36. The cover for a pre-existing jig-type fishing lure according to claim 25, wherein the membrane comprises a texture or pattern.

* * * * *